(12) United States Patent
Kawano

(10) Patent No.: US 11,455,131 B2
(45) Date of Patent: Sep. 27, 2022

(54) PRINTING APPARATUS AND NON-TRANSITORY COMPUTER-READABLE STORAGE MEDIUM STORING PROGRAM FOR CONTROLLING PRINTING BASED ON PRINT SETTINGS

(71) Applicant: SEIKO EPSON CORPORATION, Tokyo (JP)

(72) Inventor: Yo Kawano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/353,961

(22) Filed: Jun. 22, 2021

(65) Prior Publication Data

US 2021/0405932 A1 Dec. 30, 2021

(30) Foreign Application Priority Data

Jun. 24, 2020 (JP) .............................. JP2020-109026

(51) Int. Cl.
*G06F 11/07* (2006.01)
*G06F 3/12* (2006.01)

(52) U.S. Cl.
CPC ............ *G06F 3/121* (2013.01); *G06F 3/1205* (2013.01); *G06F 3/1255* (2013.01); *G06F 3/1258* (2013.01)

(58) Field of Classification Search
CPC ...... G06F 3/1205; G06F 3/121; G06F 3/1255; G06F 3/1253; G06F 3/1258
USPC .................................................. 358/1.14, 1.9
See application file for complete search history.

(56) References Cited

U.S. PATENT DOCUMENTS

| | | |
|---|---|---|
| 2004/0190047 A1 | 9/2004 | Ito et al. |
| 2008/0144087 A1* | 6/2008 | Mitsui .................. G06F 3/1204 358/1.15 |
| 2012/0050803 A1* | 3/2012 | Ebuchi .................. G06F 3/1255 358/1.15 |
| 2015/0062615 A1 | 3/2015 | Furutani et al. |
| 2018/0165751 A1 | 6/2018 | Chiyo et al. |
| 2020/0142654 A1 | 5/2020 | Imai |

FOREIGN PATENT DOCUMENTS

JP 2009-087117 A 4/2009

* cited by examiner

*Primary Examiner* — Jamares Q Washington
(74) *Attorney, Agent, or Firm* — Global IP Counselors, LLP

(57) ABSTRACT

A printing apparatus that receives user's instructions for a plurality of print settings and controls printing performs individual error display indicating prohibition near display of print settings for n print settings having a prohibition relationship, n being one or more, and does not perform the individual error display near display of the print settings for m print settings having the prohibition relationship, m being one or more.

5 Claims, 15 Drawing Sheets

PRINTING APPARATUS AND NON-TRANSITORY COMPUTER-READABLE STORAGE MEDIUM STORING PROGRAM FOR CONTROLLING PRINTING BASED ON PRINT SETTINGS

The present application is based on, and claims priority from JP Application Serial Number 2020-109026, filed Jun. 24, 2020, the disclosure of which is hereby incorporated by reference herein in its entirety.

BACKGROUND

1. Technical Field

The present disclosure relates to a printing apparatus and a non-transitory computer-readable storage medium storing a program.

2. Related Art

In electronic apparatuses, various settings are performed by users. In the following description, for convenience of description, a printing apparatus in which print settings that are settings related to printing are performed by a user will be described as an example. The printing is assumed to also include copying.

The print settings include paper, a magnification, an original document size, simplex/duplex, page aggregation, and finishing.

In the printing apparatus, printing may not be performed correctly due to a combination of a plurality of print settings. That is, when there is a combination of print settings that are prohibited from coexisting with each other among the plurality of print settings, these plurality of print settings cannot be realized together. Such a relationship of combinations of print settings that are prohibited from coexisting with each other is also referred to as, for example, a prohibition relationship between print settings.

In the printing apparatus, when a setting inconsistency, which is a prohibition relationship between print settings, occurs, printing is not performed correctly and misprinting occurs. Therefore, in the printing apparatus, it is necessary to avoid the prohibition relationship between print settings such that correct print settings are performed.

In the printing apparatus, the setting inconsistency regarding a paper setting may occur. Such a setting inconsistency will also be referred to as a paper mismatch. That is, the paper mismatch is a kind of setting inconsistency, and the setting inconsistency is a kind of error.

For example, in a printing control apparatus described in JP-A-2009-87117, it is attempted to set a combination of a printable paper size and a margin amount (refer to JP-A-2009-87117).

However, in the related art, when a plurality of setting inconsistencies occur at the same time, it may not be possible to easily solve all the setting inconsistencies.

SUMMARY

According to an aspect of the present disclosure, there is provided a printing apparatus that receives user's instructions for a plurality of print settings and controls printing, the printing apparatus including a reception section that receives the user's instructions; a control section that sets the print settings based on the instructions received by the reception section and controls the printing according to the set print settings; and a display section that performs display, in which the control section performs, on the display section, individual error display indicating prohibition near display of the print settings for n print settings having a prohibition relationship, n being one or more, and does not perform the individual error display near display of the print settings for m print settings having the prohibition relationship, m being one or more.

According to another aspect of the present disclosure, there is provided a non-transitory computer-readable storage medium storing a program that receives user's instructions for a plurality of setting items and causes a computer to execute control of a control target, the program causing the computer to realize a reception function of receiving the user's instructions; a control function of setting the setting items based on the instructions received by the reception function and controlling the control target according to the set setting items; and a display function of performing individual error display near display of the setting items for n setting items having a prohibition relationship, n being one or more, and not performing the individual error display near display of the setting items for m setting items having the prohibition relationship, m being one or more.

DESCRIPTION OF EXEMPLARY EMBODIMENTS

Hereinafter, an embodiment will be described with reference to the drawings.

Figure 1:
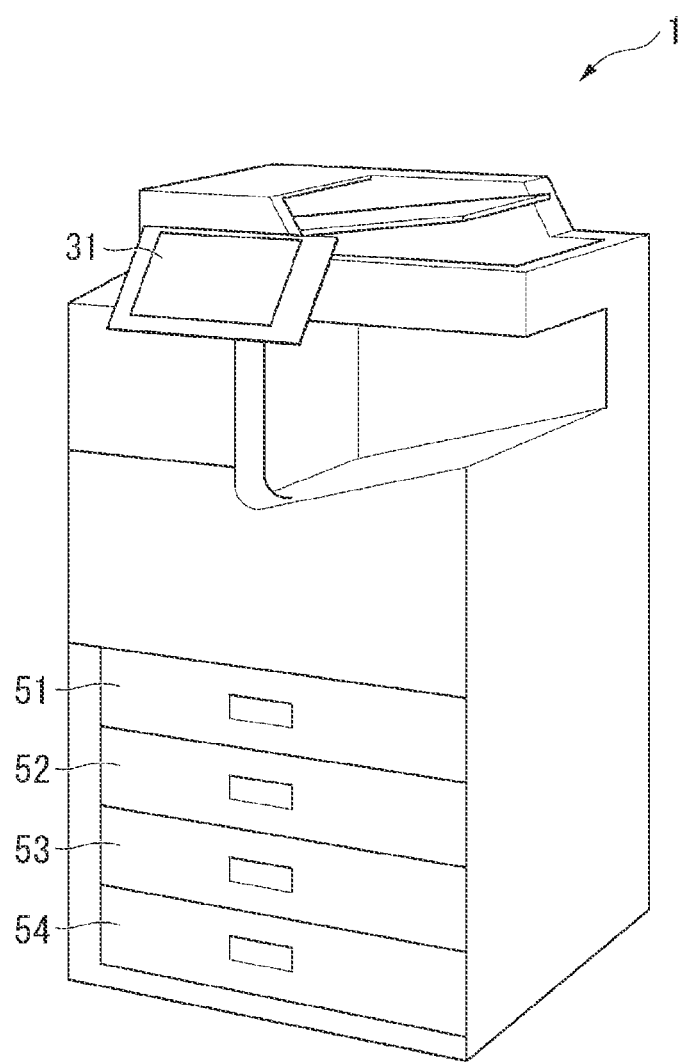
FIG. 1 is a perspective view illustrating a schematic exterior of a printing apparatus according to an embodiment.

FIG. 1 is a perspective view illustrating a schematic exterior of a printing apparatus 1 according to an embodiment.

The printing apparatus 1 includes a display 31 and a plurality of trays 51 to 54. In the example illustrated in FIG. 1, the number of trays 51 to 54 is four, but may be other numbers.

In the example illustrated in FIG. 1, although details of other portions of the printing apparatus 1 are not illustrated, the printing apparatus 1 includes various other portions.

In the present embodiment, the printing apparatus 1 performs printing on a printing medium using ink. In the present embodiment, a case where paper is used as the printing medium is described, but other printing media may be used.

As the printing apparatus 1, for example, a printing apparatus that uses a printing method other than ink may be used.

The display 31 has a screen.

Each of the trays 51 to 54 stores paper.

An ink storage portion for storing ink is installed inside the printing apparatus 1. For example, when there are types of ink of a plurality of colors, there is an ink storage portion for each type of ink.

Figure 2:
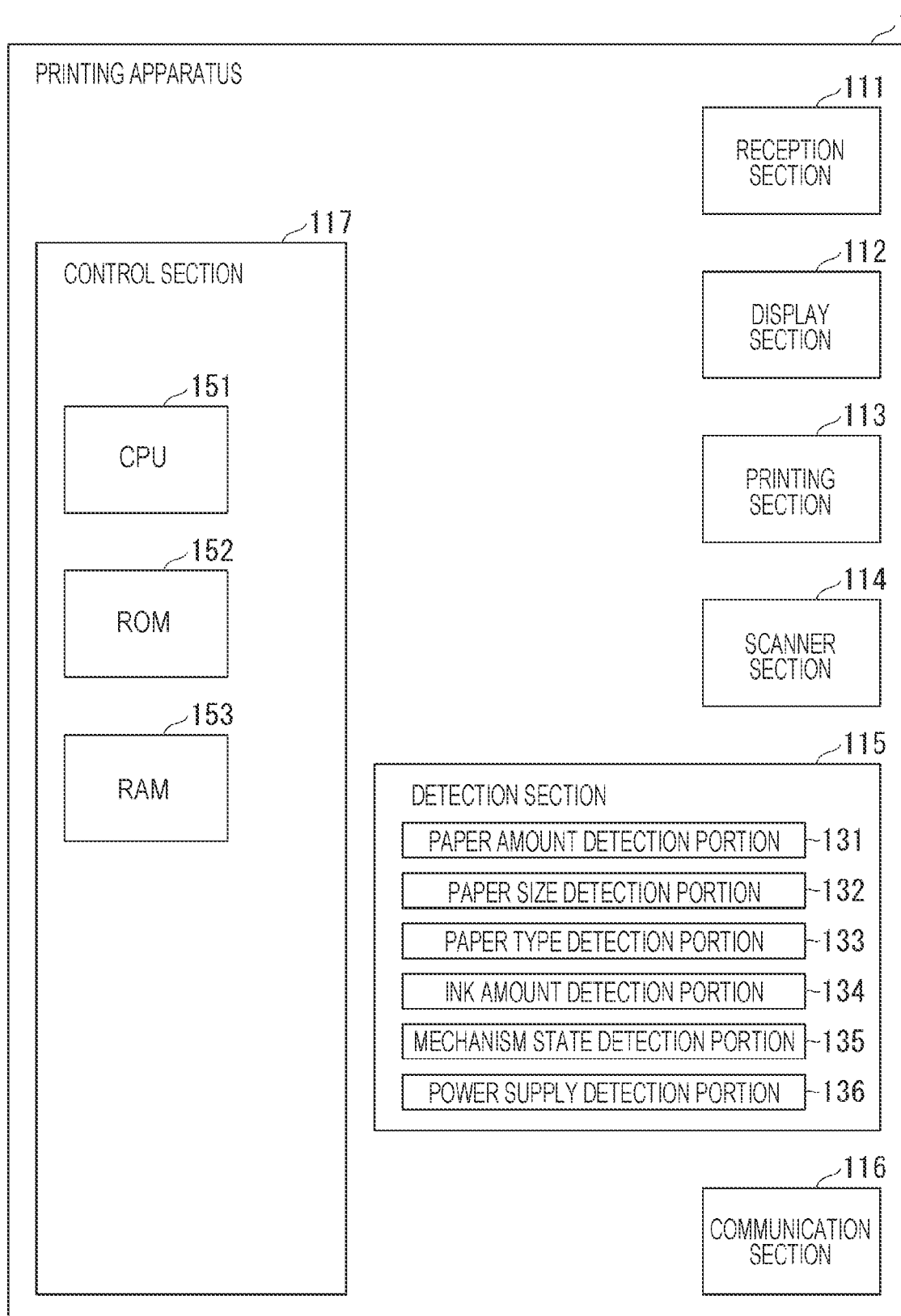
FIG. 2 is a diagram illustrating a schematic functional block of the printing apparatus according to the embodiment.

FIG. 2 is a diagram illustrating a schematic functional block of the printing apparatus 1 according to the embodiment.

The printing apparatus 1 according to the present embodiment receives user's instructions for a plurality of print settings and controls printing.

The printing apparatus 1 includes a reception section 111, a display section 112, a printing section 113, a scanner section 114, a detection section 115, a communication section 116, and a control section 117.

The detection section 115 includes a paper amount detection portion 131, a paper size detection portion 132, a paper type detection portion 133, an ink amount detection portion 134, a mechanism state detection portion 135, and a power supply detection portion 136.

The control section 117 includes a central processing unit (CPU) 151 as an example of a processor, a read only memory (ROM) 152, and a random access memory (RAM) 153.

The reception section 111 has an operation portion operated by the user, and receives the user's instruction by receiving details of an operation performed on the operation portion by the user. The reception section 111 may be, for example, various mechanical keys.

The display section 112 performs display. In the present embodiment, the display section 112 has a screen, and displays various information on the screen.

Here, the reception section 111 and the display section 112 may be configured as, for example, a touch panel. In the present embodiment, the screen of the display 31 in the example illustrated in FIG. 1 is used as a screen of the touch panel. The touch panel may also be referred to as, for example, a control panel.

The printing section 113 prints an image on printing target paper. The image may include, for example, characters and figures.

The scanner section 114 reads a reading target image.

The detection section 115 detects various states related to the printing apparatus 1. The detection section 115 may be configured by using, for example, various sensors.

The paper amount detection portion 131 detects information regarding an amount of paper stored in each of the trays 51 to 54. The information may be, for example, information indicating whether or not an amount of the paper is equal to or less than a predetermined threshold value.

The paper size detection portion 132 detects information regarding a size of the paper stored in each of the trays 51 to 54. The information may be, for example, information such as A5, A4, or A3.

The paper type detection portion 133 detects information regarding the type of paper stored in each of the trays 51 to 54. The information may be information such as plain paper, dedicated paper, or thick paper.

The ink amount detection portion 134 detects information regarding an amount of ink. The information may be, for example, information indicating whether or not an amount of ink is equal to or less than a predetermined threshold value. The information regarding an amount of ink may be, for example, information for each type of ink when there are types of ink of a plurality of colors.

The mechanism state detection portion 135 detects information regarding a state of a predetermined mechanism in the printing apparatus 1. The mechanism may be, for example, a mechanical switching mechanism that cannot perform automatic switching. Such a mechanical switching mechanism may be a mechanism that is subjected to manual switching by a user, such as a two-stage tray switching mechanism, an open/closed state switching mechanism.

The power supply detection portion 136 detects information regarding a power supply. The information may be, for example, information indicating an ON state of the power supply.

In the present embodiment, the printing apparatus 1 is a stationary printing apparatus, but may be a mobile printing apparatus as another example. In the mobile printing apparatus, for example, a battery may be used. In this case, the power supply detection portion 136 may detect information indicating whether or not a residual quantity of the battery is equal to or less than a predetermined threshold value.

The communication section 116 communicates with an external apparatus.

The communication may be, for example, wired communication or wireless communication.

The communication section 116 may also be referred to as a communication circuit, a communication port, a communication interface, or the like.

The control section 117 performs various types of control.

The ROM 152 and the RAM 153 store various information. The information includes prohibition information that is information indicating a prohibition relationship. The information may also include, for example, a program and parameters used by the program.

The ROM 152 and the RAM 153 may be freely used.

The CPU 151 performs various types of control by executing the program by using a storage region of the RAM 153.

For example, the control section 117 sets a print setting based on an instruction received by the reception section 111, and controls printing according to the set print setting. The control section 117 displays various information on the display section 112.

Figure 3:
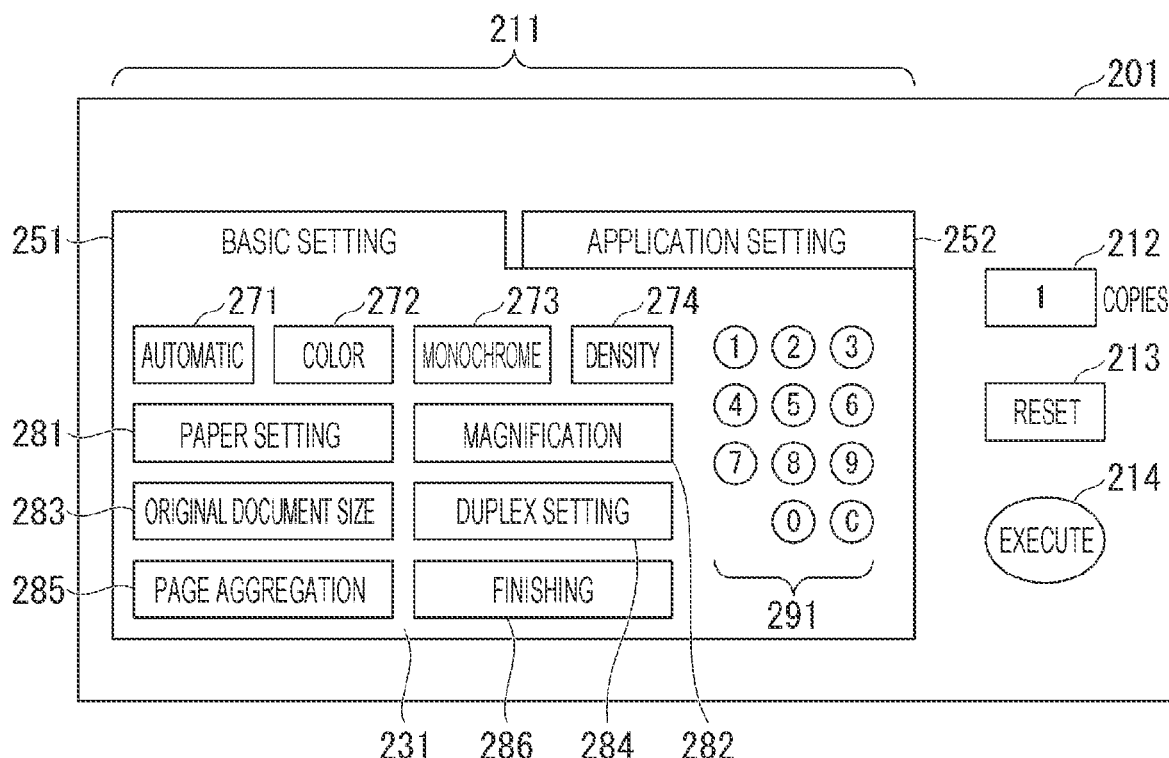
FIG. 3 is a diagram illustrating an example of a basic display screen of the printing apparatus according to the embodiment.

FIG. 3 is a diagram illustrating an example of a basic display screen 201 of the printing apparatus 1 according to the embodiment.

The basic display screen 201 displays a basic screen in the printing apparatus 1 according to the present embodiment. A screen display aspect is not limited to the example in the present embodiment, and any aspect may be used.

The basic display screen 201 includes a setting screen display portion 211, a number-of-copies setting portion 212, a reset button 213, and an execution button 214.

The number-of-copies setting portion 212 is a portion indicating the number of copies set for printing or the like.

The reset button 213 is a display frame button for receiving instructions for resetting various setting details.

The execution button 214 is a display frame button for receiving an instruction for executing printing or the like.

The setting screen display portion 211 includes a first tab setting screen display portion 231 including a first tab 251, and a second tab 252.

In the present embodiment, the first tab 251 is a tab corresponding to a basic setting, and the second tab 252 is a tab corresponding to an application setting.

In the example illustrated in FIG. 3, in a state in which the first tab 251 is selected, the first tab setting screen display portion 231 corresponding to the first tab 251 is displayed.

In a state in which the second tab 252 is selected, a second tab setting screen display portion which is not illustrated in FIG. 3, corresponding to the second tab 252, is displayed.

In the present embodiment, two tabs are illustrated, but as another configuration example, the number of tabs may be one or three or more.

In the present embodiment, when all print setting items are displayed on a screen display portion of one tab, each print setting item become smaller, and thus a plurality of print setting items are distributed to the screen display portions of a plurality of tabs.

The first tab setting screen display portion 231 includes an automatic button 271, a color button 272, a monochrome button 273, a density button 274, and numerical value buttons 291.

The automatic button 271 is a display frame button for receiving an instruction for a process for automatically setting color/monochrome.

The color button 272 is a display frame button for receiving a color instruction.

The monochrome button 273 is a display frame button for receiving a monochrome instruction.

In the present embodiment, any one of the automatic button 271, the color button 272, and the monochrome button 273 is enabled.

The density button 274 is a display frame button for receiving a density instruction.

The numerical value buttons 291 include display frame buttons such as "0" to "9" for receiving instructions for the respective numerical values of 0 to 9 for designating the number of copies to be printed, and a display frame button "C" for receiving an instruction for clearing numerical values.

The first tab setting screen display portion 231 includes a first print setting display frame 281 to a sixth print setting display frame 286.

The first print setting display frame 281 is a display frame button for receiving an instruction for setting paper. In the present embodiment, the paper setting includes setting of the trays 51 to 54 used for paper feeding, setting of a paper size, and setting of a vertical/horizontal direction of paper. In the present embodiment, the first print setting display frame 281 displays information indicating an amount of paper in the trays 51 to 54 used for paper feeding.

The second print setting display frame 282 is a display frame button for receiving an instruction for setting a magnification.

The third print setting display frame 283 is a display frame button for receiving an instruction for setting an original document size and an instruction for a vertical/horizontal direction of an original document.

The fourth print setting display frame 284 is a display frame button for receiving an instruction for setting a simplex/duplex.

The fifth print setting display frame 285 is a display frame button for receiving an instruction for setting page aggregation.

The sixth print setting display frame 286 is a display frame button for receiving instructions for setting finishing including setting related to stapling.

In the present embodiment, it is assumed that the first print setting display frame 281 to the sixth print setting display frame 286 have higher priority in this order.

That is, in the present embodiment, with respect to the first print setting display frame 281 to the sixth print setting display frame 286, the upper side has priority over the lower side and the left side has priority over the right side in the line of sight in which a screen is seen by the user.

In the present embodiment, information corresponding to each tab is displayed on the tab.

in the present embodiment, information corresponding to each display frame is displayed in the display frame. For example, in each of the first print setting display frame 281 to the sixth print setting display frame 286, details currently set for the corresponding print settings are displayed.

in the present embodiment, when the tabs and the display frame buttons are touched by the user's finger, respectively corresponding instructions are received.

In the printing apparatus 1 according to the present embodiment, a configuration example in which the tab is touched by the user's finger to transition to a display state of the screen display portion corresponding to the touched tab is described, but, as another configuration example, other predetermined marks may be used instead of the tab.

In the present embodiment, the plurality of print setting display frames included in the second tab setting screen display portion selected by using the second tab 252 include print setting display frames for print settings such as the original document type, a binding margin, ID card copy, page number printing, and original document size mixing, and shadow erasing.

Here, the print settings in the printing apparatus 1 according to the present embodiment will be described.

Settings related to paper include a size of paper and the type of paper.

In the present embodiment, it is assumed that the user does not directly select a size of paper and the type of paper.

In the present embodiment, in the printing apparatus 1, when the paper trays 51 to 54 are selected, the control section 117 selects a size and a type suitable for paper stored in the selected trays 51 to 54.

Here, in the present embodiment, in the printing apparatus 1, each of the trays 51 to 54 is provided with a paper size detection portion 132 and a paper type detection portion 133. The printing apparatus 1 automatically detects a size and the type of the paper stored in each of the trays 51 to 54.

As another configuration example, in the printing apparatus 1, the size and type of the paper stored in each of the trays 51 to 54 may be manually set and stored in advance by the user. In this case, the printing apparatus 1 does not need to include the paper size detection portion 132 and the paper type detection portion 133.

In the printing apparatus 1 according to the present embodiment, the control section 117 has an automatic selection function of automatically selecting the trays 51 to 54 for feeding paper based on the original document size and the magnification.

In the printing apparatus 1 according to the present embodiment, the control section 117 has a function of changing the trays 51 to 54 for feeding paper through an operation of the user. Thus, in the printing apparatus 1, the paper stored in the trays 51 to 54 selected by the user may not match the current print settings. Even when the automatic selection function is used, the paper stored in any of the trays 51 to 54 may not match the current print settings.

Here, in the present embodiment, for convenience of description, the occurrence of such an inconsistency in print settings and the occurrence of a prohibition relationship regarding paper will be described as a paper mismatch. In the present embodiment, for convenience of description, a description will be made of a case where a total number of respective paper mismatches is determined as the number of paper mismatches assuming that each paper mismatch corresponds to a prohibition relationship that can be solved.

As specific examples, a paper mismatch case 1 to a paper mismatch case 4 will be described.

The paper mismatch case 1 relates to a case where "stapling at two locations on a short side of paper" is selected. In this case, a paper size is required to be A4 or more due to the restriction on a stapling mechanism. In this case, when the user selects the trays 51 to 54 storing A5 paper, a paper mismatch occurs.

In this case, as the paper mismatch, for example, a paper mismatch of "paper setting" and a paper mismatch of "finishing" occur.

The paper mismatch case 2 relates to a case where the trays 51 to 54 storing A5 paper are selected by the user and "printing original document with A4 size at 4UP" is selected. In this case, 4UP printing of the A4 original document size can be performed only on paper with the A4 paper size or larger, and thus a paper mismatch occurs. A print setting of the 4UP printing is a print setting in which images of four original documents are printed on one sheet of paper in page aggregation. The 4UP printing may be referred to as, for example, 4in1 printing.

In this case, as the paper mismatch, for example, a paper mismatch of "paper setting" and a paper mismatch of "page aggregation" occur.

The paper mismatch case 3 relates to a case where paper with the A5 paper size stored in the selected trays 51 to 54 is thick paper. In this case, when "duplex printing" is selected, duplex printing of thick paper is not possible due to the restriction on a paper feeding mechanism, and thus a paper mismatch occurs.

In this case, as the paper mismatch, for example, a paper mismatch of "paper setting" and a paper mismatch of "simplex/duplex" occur.

The paper mismatch case 4 relates to a case where there are a plurality of trays 51 to 54 as in the printing apparatus 1 according to the present embodiment. In this case, when a master-slave relationship between the trays is set, the paper in the slave tray is required to satisfy a condition with the paper in the master tray, and, when the condition is not satisfied, a paper mismatch occurs.

In this case, as the paper mismatch, for example, the paper mismatch of "paper setting" occurs.

Here, in the present embodiment, a main tray is referred to as a master tray, and a subsidiary tray is referred to as a slave tray.

For example, in relation to bookbinding, a tray for feeding paper used for the text is set as the master tray, and a tray for feeding paper used for a cover is set as the slave tray. In this example, a size of the paper stored in the slave tray for the cover is required to match a size of the paper stored in the master tray for the text.

A description will be made of display regarding the prohibition relationship of the print settings in the printing apparatus 1 according to the present embodiment.

A description will be made of a method for determining whether or not the control section 117 provides a notification of a paper mismatch in the printing apparatus 1.

In the present embodiment, in the printing apparatus 1, the control section 117 notifies the user of a paper mismatch by displaying a predetermined mark indicating an error on a predetermined portion of the screen.

In the present embodiment, in the printing apparatus 1, when a prohibition relationship regarding a plurality of print settings included in one display screen occurs, the control section 117 performs a process of providing a notification of a paper mismatch for all of the plurality of print settings or a process of providing a notification of a paper mismatch for only some of the plurality of print settings, based on predetermined conditions.

A specific example will be described.

When only one paper mismatch occurs, the control section 117 provides a notification of the paper mismatch for all the print setting items that are targets of the paper mismatch.

When only one paper mismatch occurs, for example, one of the paper mismatch case 1 to the paper mismatch case 4 occurs.

As an example, when only the paper mismatch case 1 occurs, the control section 117 provides a notification of the paper mismatch for both "paper setting" and "finishing" as all the print setting items that are targets of the paper mismatch.

When two or more paper mismatches occur together, the control section 117 provides a notification of only a part of the paper mismatches selected according to a predetermined rule.

As an example, when the paper mismatch case 1 and the paper mismatch case 4 occur, the control section 117 provides a notification of the paper mismatch only for the "paper setting" and the "finishing" of the master tray.

When only one paper mismatch occurs for a plurality of setting items displayed on one display screen, the control section 117 provides a notification of the paper mismatch for all the print setting items that are targets of the paper mismatch.

On the other hand, when two or more paper mismatches occur for a plurality of setting items displayed in one display screen, the control section 117 provides a notification of the paper mismatch only for, for example, "paper setting", and does not provide a notification of the paper mismatch for "finishing" even when "finishing" is a target of the paper mismatch.

Examples of display screen in the printing apparatus 1 will be described with reference to FIGS. 4 to 10.

Here, the examples illustrated in FIGS. 4 to 10 are examples of display screen based on the basic display screen 201 illustrated in FIG. 3. Thus, in the examples illustrated in FIGS. 4 to 10, for convenience of description, the same portions as those of the basic display screen 201 illustrated in FIG. 3 will be given the same reference numerals and will be described.

In the printing apparatus 1, for the display screens illustrated in FIGS. 4 to 10, for example, any one or more display screens may be used, and two or more display screens may be combined and used.

Figure 4:
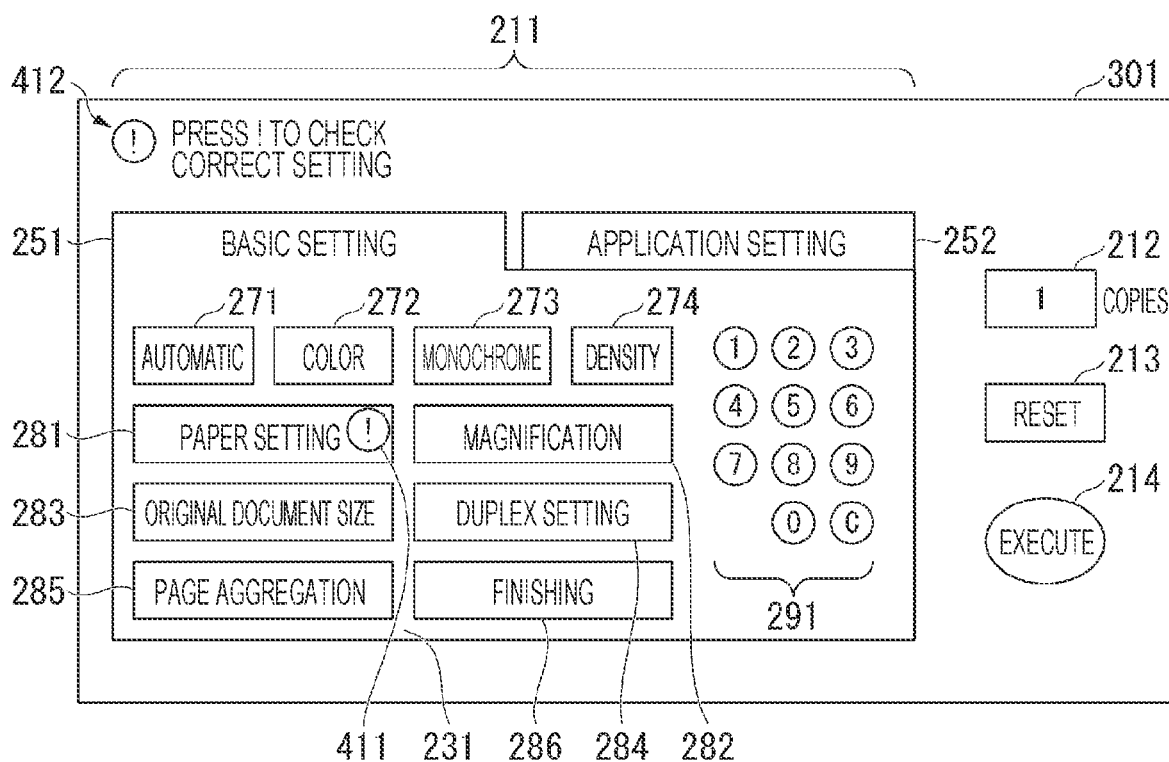
FIG. 4 is a diagram illustrating an example of a first display screen of the printing apparatus according to the embodiment.

FIG. 4 is a diagram illustrating an example of a first display screen 301 of the printing apparatus 1 according to the embodiment when there is a setting in which an original document with the A4 size is printed on A5 paper at 4UP and stapling is performed at two locations on the short side of the paper.

In the first display screen 301, the first tab 251 is selected.

In the first display screen 301, a first individual error mark 411 is displayed only for the first print setting display frame 281 corresponding to the "paper setting". In the first display screen 301, a notification of the paper mismatch is not provided for "page aggregation" and "finishing".

The first individual error mark 411 is an example of an individual error mark that is a mark for providing a notification of the paper mismatch for each individual print setting. The individual error mark indicates that prohibition has occurred. The display of the individual error mark is an example of individual error display. Any design or pattern of the individual error mark may be used.

In the printing apparatus 1, the control section 117 displays an individual error mark near a displayed print setting for each individual print setting on the display section 112. A position near the displayed print setting may be, for example, a position having a portion overlapping with the displayed print setting, or a position having not overlapping with the displayed print setting.

In the present embodiment, in the printing apparatus 1, the control section 117 disposes an individual error mark on the right side of the print setting frame for each individual print setting. The individual error mark may be disposed at any position where a print setting corresponding to the individual error mark can be visually recognized, for example.

The first individual error explanation information 412 is displayed on the first display screen 301.

First individual error explanation information 412 is an example of individual error explanation information which is information representing the explanation about the individual error mark. In the present embodiment, the individual error explanation information is information such as "press the individual error mark to check the correct setting".

In the present embodiment, in the printing apparatus 1, the control section 117 disposes the individual error explanation information in the upper left of the display screen in common to one or more individual error marks. The individual error explanation information may be disposed at any position.

When the first display screen 301 illustrated in FIG. 4 displays individual error marks for three or more setting items, it is difficult for the user to understand where to operate to eliminate the error, and thus individual error marks are not displayed for some setting items.

Here, it may be variously determined for which setting item the individual error mark is displayed and for which setting item the individual error mark is not displayed. For example, in the printing apparatus 1, the control section 117 may perform individual error display for a print setting in which there are few procedures for changing the print setting until the paper mismatch is solved, in preference to a print setting having more procedures. As a print setting in which the number of procedures for changing the print setting until the paper mismatch is solved is small, for example, it is preferable to use a print setting in which the number of procedures is the minimum. Specifically, in a case where there is a setting in which an original document with the A4 size is printed on A5 paper at 4UP and stapling is performed at two locations on the short side of the paper, and all paper mismatches are solved when paper with a size of A4 or more is set in "paper setting", the control section 117 displays an individual error mark only for the "paper setting" in which the number of procedures for changing the print setting is 1 that is the minimum. The control section 117 does not perform the individual error display for the print settings other than the print setting for which the individual error display is performed.

Figure 5:
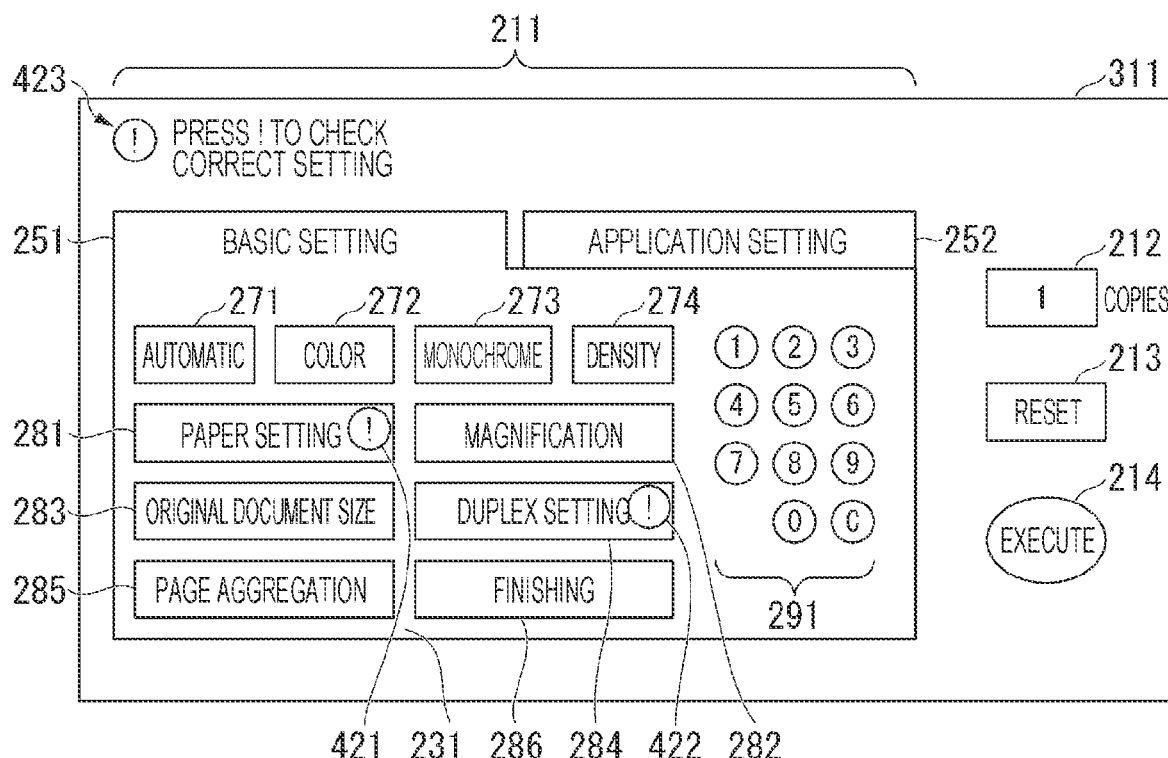
FIG. 5 is a diagram illustrating an example of a second display screen of the printing apparatus according to the embodiment.

FIG. 5 is a diagram illustrating an example of a second display screen 311 of the printing apparatus 1 according to the embodiment in which setting of performing duplex printing on thick paper is performed.

The first tab 251 is selected in the second display screen 311.

In the second display screen 311, a second-first individual error mark 421 is displayed for the first print setting display frame 281 corresponding to the "paper setting". In the second display screen 311, a second-second individual error mark 422 is displayed for the fourth print setting display frame 284 corresponding to the "duplex setting".

The second-first individual error mark 421 and the second-second individual error mark 422 are examples of individual error marks.

Second individual error explanation information 423 is displayed on the second display screen 311.

The second individual error explanation information 423 is an example of individual error explanation information.

The second display screen 311 illustrated in FIG. 5 is displayed, for example, when only one paper mismatch has occurred. In this case, in the example illustrated in FIG. 5, all the print setting items that are targets of one paper mismatch are the "paper setting" and the "duplex setting".

Figure 6:
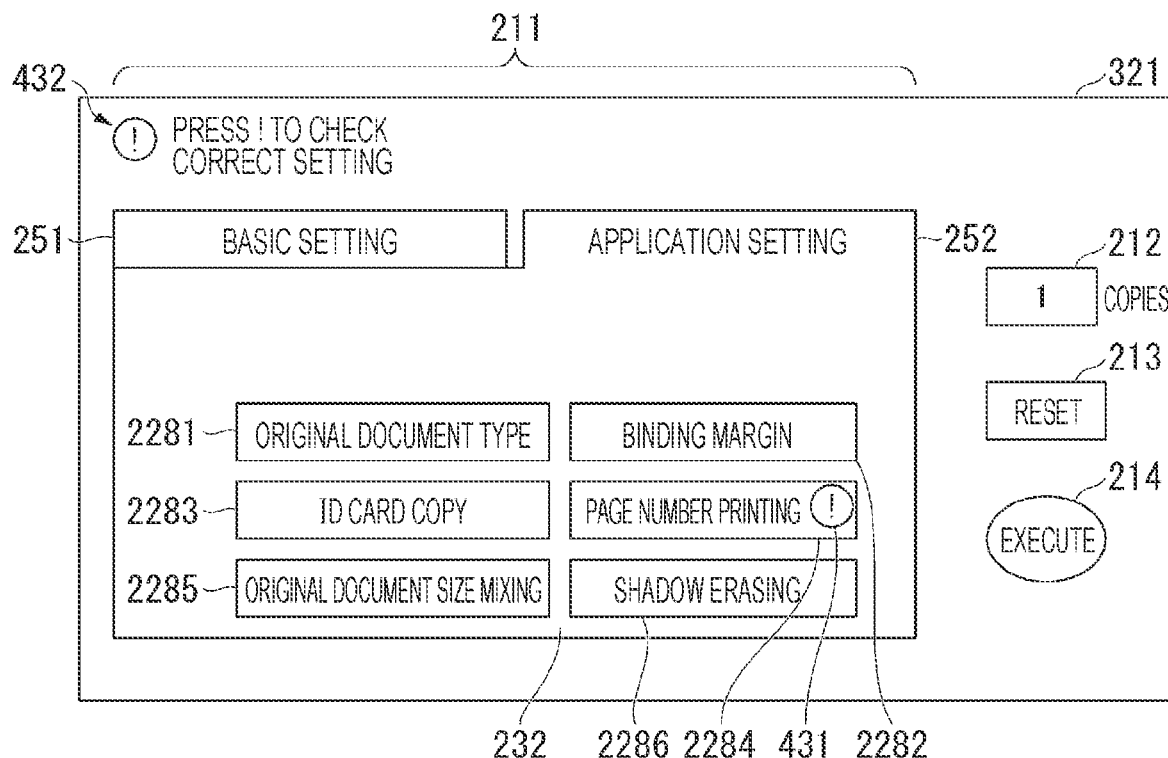
FIG. 6 is a diagram illustrating an example of a third display screen of the printing apparatus according to the embodiment.

FIG. 6 is a diagram illustrating an example of a third display screen 321 of the printing apparatus 1 according to the embodiment.

The second tab 252 is selected in the third display screen 321.

In the example illustrated in FIG. 6, in a state in which the second tab 252 is selected, a second tab setting screen display portion 232 corresponding to the second tab 252 is displayed.

The second tab setting screen display portion 232 includes the second tab 252 and a seventh print setting display frame 2281 to a twelfth print setting display frame 2286. The seventh print setting display frame 2281 to the twelfth print setting display frame 2286 respectively correspond to various print setting items, and correspond to items different from those of the first print setting display frame 281 to the sixth print setting display frame 286.

The seventh print setting display frame 2281 is a display frame button for receiving an instruction for setting the original document type.

The eighth print setting display frame 2282 is a display frame button for receiving an instruction for setting a binding margin.

The ninth print setting display frame 2283 is a display frame button for receiving an instruction for setting ID card copy.

The tenth print setting display frame 2284 is a display frame button for receiving an instruction for setting page number printing.

The eleventh print setting display frame 2285 is a display frame button for receiving an instruction for setting original document size mixing.

The twelfth print setting display frame 2286 is a display frame button for receiving an instruction for setting shadow erasing.

In the third display screen 321, a third individual error mark 431 is displayed for the tenth print setting display frame 2284.

The third individual error mark 431 is an example of the individual error mark.

The third individual error explanation information 432 is displayed on the third display screen 321.

The third individual error explanation information 432 is an example of individual error explanation information.

The third display screen 321 illustrated in FIG. 6 is displayed, for example, when two or more paper mismatches occur together, there is no master-slave relationship between the trays 51 to 54, and only one paper mismatch occurs for a plurality of setting items displayed on one third display screen 321. In this case, in the example illustrated in FIG. 6, all the print setting items that are targets of such one paper mismatch are only an item of the tenth print setting display frame 2284.

Figure 7:
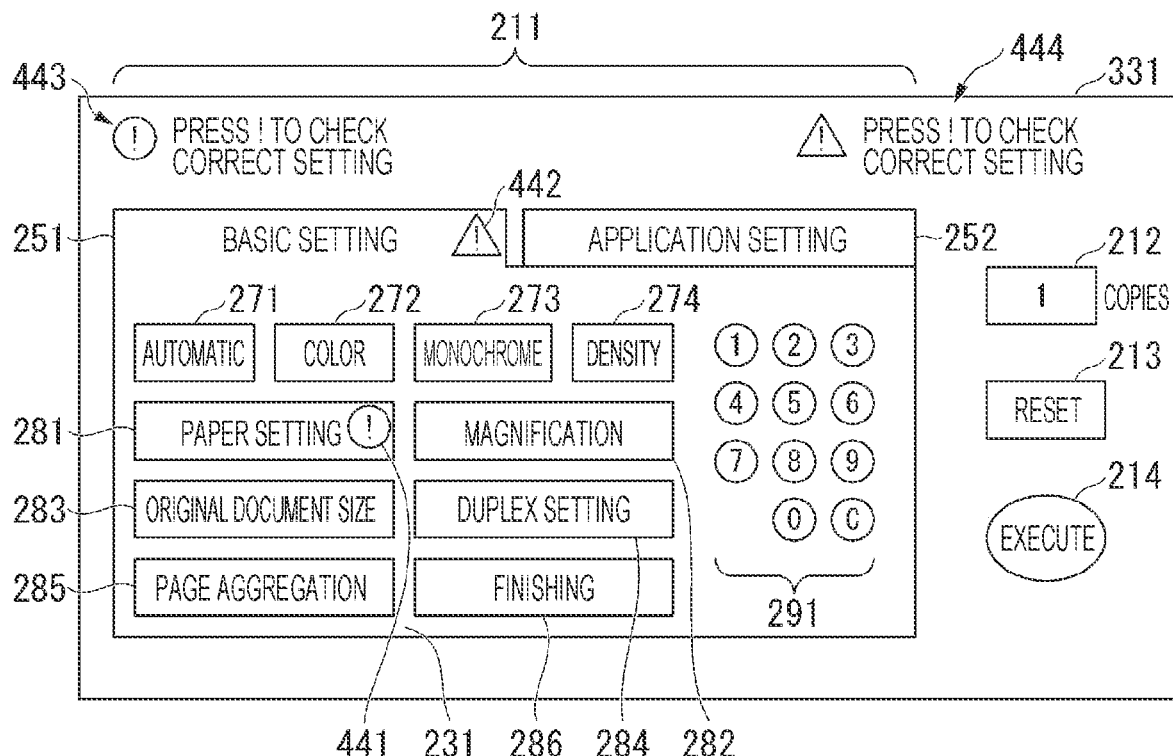
FIG. 7 is a diagram illustrating an example of a fourth display screen of the printing apparatus according to the embodiment.

FIG. 7 is a diagram illustrating an example of a fourth display screen 331 of the printing apparatus 1 according to the embodiment.

In the fourth display screen 331, the first tab 251 is selected.

A fourth individual error mark 441 is displayed for the first print setting display frame 281 on the fourth display screen 331.

The fourth individual error mark 441 is an example of an individual error mark.

A fourth individual error explanation information 443 is displayed on the fourth display screen 331.

The fourth individual error explanation information 443 is an example of individual error explanation information.

A first batch error mark 442 is displayed for the first tab 251 on the fourth display screen 331.

The first batch error mark 442 is an example of a batch error mark which is a mark for providing a notification of a paper mismatch in any of the print settings included in the screen display portion of each tab. The batch error mark indicates that prohibition has occurred. The display of the batch error mark is an example of batch error display. Any design or pattern of the batch error mark may be used.

In the present embodiment, different marks such as the individual error mark and the batch error mark are used, but the same mark may be used as another configuration example.

In the printing apparatus 1, the control section 117 displays the batch error mark at a position away from the display of the print setting on the display section 112.

In the present embodiment, in the printing apparatus 1, the control section 117 displays the batch error mark near each tab. The position near the tab may be, for example, a position having a portion overlapping with the tab, or a position having a portion not overlapping with the tab.

As a specific example, in the printing apparatus 1, the control section 117 disposes the batch error mark on the right side of the tab frame for each tab. The batch error mark may be disposed at any position where the tab corresponding to the batch error mark can be visually recognized, for example.

First batch error explanation information 444 is displayed on the fourth display screen 331.

The first batch error explanation information 444 is an example of batch error explanation information which is information representing an explanation regarding the batch error mark. In the present embodiment, the batch error explanation information is information such as "press the batch error mark to check the correct setting".

In the present embodiment, in the printing apparatus 1, the control section 117 disposes the batch error explanation information on the upper right of the display screen in common to one or more batch error marks. The batch error explanation information may be disposed at any position.

Here, in the present embodiment, although the individual error mark is not displayed in the print settings included in the screen display portion of the tab on which the batch error mark is displayed, the batch error mark indicates that a print setting in which a paper mismatch has occurred is present.

In the example illustrated in FIG. 7, among the plurality of print settings corresponding to the first print setting display frame 281 to the sixth print setting display frame 286 included in the first tab setting screen display portion 231, the fourth individual error mark 441 is displayed for only the first print setting display frame 281 corresponding to the "paper setting", but paper mismatches have also occurred in one or more other print settings. In this case, in the example illustrated in FIG. 7, the first batch error mark 442 is displayed on the first tab 251.

When the user touches the fourth individual error mark 441, a method of solving the error by changing the setting of "paper setting" is displayed, and when the user touches the first batch error mark 442, all methods of solving the error by changing corresponding settings are displayed. When the user touches the first batch error mark 442, with respect to the settings other than the "paper setting" for which the fourth individual error mark 441 is displayed, all methods of solving the error by changing corresponding settings may be displayed.

Figure 8:
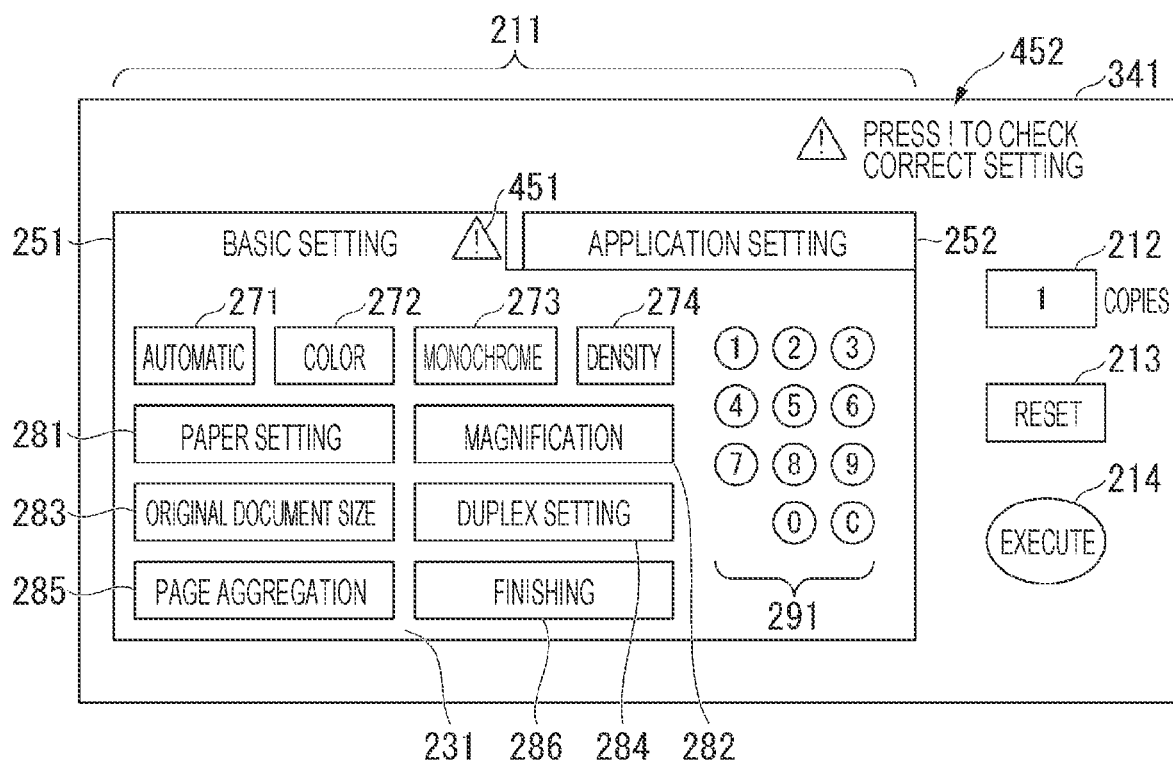
FIG. 8 is a diagram illustrating an example of a fifth display screen of the printing apparatus according to the embodiment.

FIG. 8 is a diagram illustrating an example of a fifth display screen 341 of the printing apparatus 1 according to the embodiment.

In the fifth display screen 341, the first tab 251 is selected.

A second batch error mark 451 is displayed for the first tab 251 on the fifth display screen 341.

The second batch error mark 451 is an example of a batch error mark.

Second batch error explanation information 452 is displayed on the fourth display screen 331.

The second batch error explanation information 452 is an example of batch error explanation information.

The fifth display screen 341 illustrated in FIG. 8 may be displayed, for example, when two or more paper mismatches have occurred for a plurality of setting items displayed on one fifth display screen 341.

Figure 9:
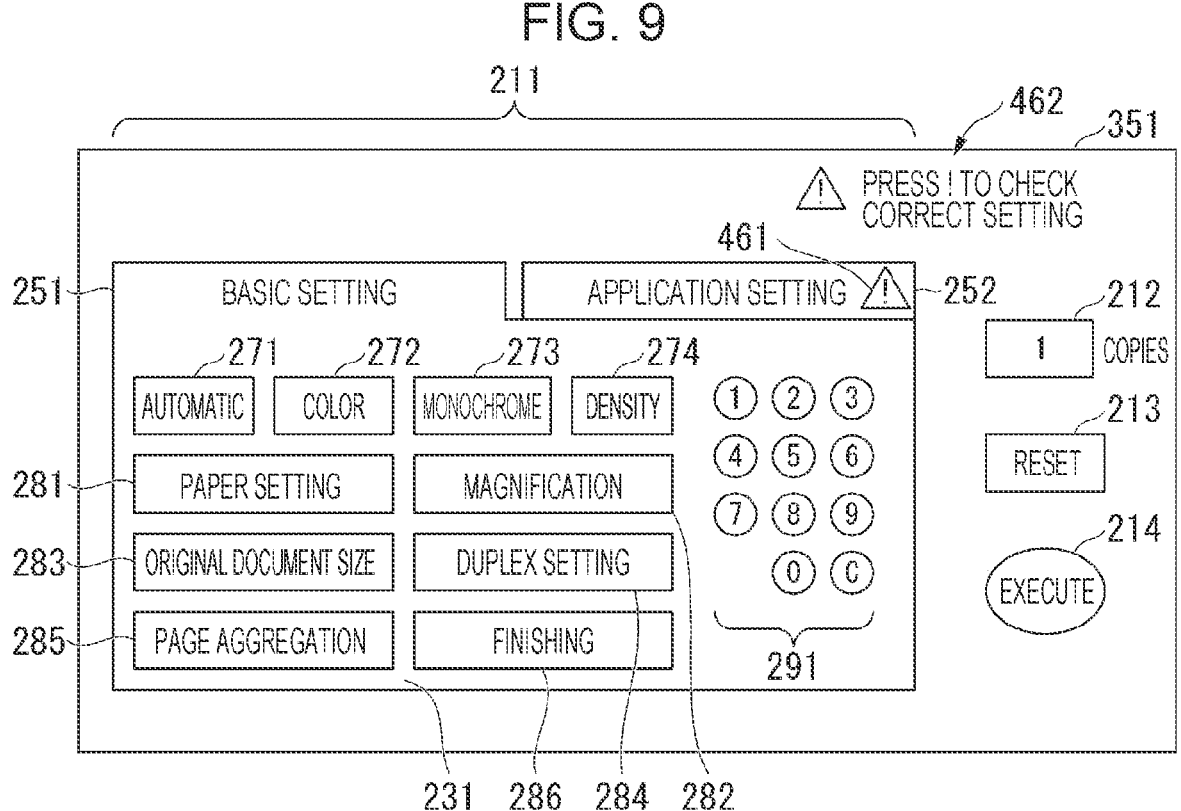
FIG. 9 is a diagram illustrating an example of a sixth display screen of the printing apparatus according to the embodiment.

FIG. 9 is a diagram illustrating an example of a sixth display screen 351 of the printing apparatus 1 according to the embodiment.

In the sixth display screen 351, the first tab 251 is selected.

A third batch error mark 461 is displayed for the second tab 252 on the sixth display screen 351.

The third batch error mark 461 is an example of a batch error mark.

Third batch error explanation information 462 is displayed on the sixth display screen 351.

The third batch error explanation information 462 is an example of batch error explanation information.

The sixth display screen 351 illustrated in FIG. 9 may be displayed, for example, when one or more paper mismatches have occurred for a plurality of setting items not displayed on one sixth display screen 351. Specifically, in a case where one or more paper mismatches have occurred for a plurality of setting items included in a screen displayed when the second tab 252 is selected, the third batch error mark 461 is displayed for the second tab 252.

Figure 10:
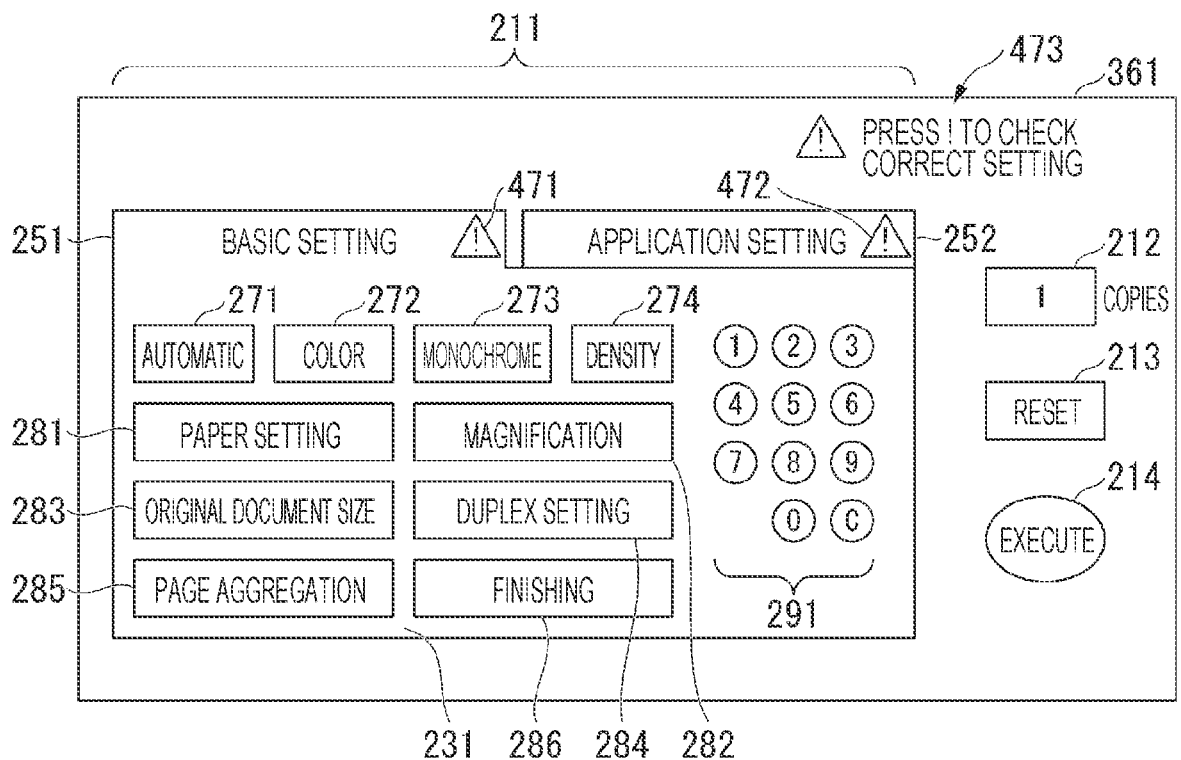
FIG. 10 is a diagram illustrating an example of a seventh display screen of the printing apparatus according to the embodiment.

FIG. 10 is a diagram illustrating an example of a seventh display screen 361 of the printing apparatus 1 according to the embodiment.

In the seventh display screen 361, the first tab 251 is selected.

A fourth-first batch error mark 471 is displayed for the first tab 251 on the seventh display screen 361.

The fourth-first batch error mark 471 is an example of a batch error mark.

A fourth-second batch error mark 472 is displayed for the second tab 252 on the seventh display screen 361.

The fourth-second batch error mark 472 is an example of a batch error mark.

Fourth batch error explanation information 473 is displayed on the seventh display screen 361.

The fourth batch error explanation information 473 is an example of batch error explanation information.

The seventh display screen 361 illustrated in FIG. 10 may be displayed, for example, when two or more paper mismatches have occurred for a plurality of setting items included in the display screen of the first tab 251 and two or more paper mismatches have occurred for a plurality of setting items included in the display screen of the display screen of the second tab 252.

Here, the display screens illustrated in FIGS. 4 to 10 may be used in various cases.

For example, the control section 117 may display the screen illustrated in any of FIGS. 4 to 7 when individual error display indicating prohibition is performed near the display of the print settings for some of the print settings having a prohibition relationship, and individual error display is not performed near the display of the print settings for some other print settings having a prohibition relationship. As a specific example, some of the print settings having a prohibition relationship are n print settings having the prohibition relationship, n being one or more, and some other print settings having the prohibition relationship is m print settings having the prohibition relationship, m being one or more. Such n and m may be determined as appropriate.

For example, the control section 117 may display the screen illustrated in any of FIGS. 7 to 10 when batch error display indicating prohibition is performed at a position away from the display of the print settings for some other print settings having the prohibition relationship.

For example, the control section 117 may display the screen illustrated in any of FIGS. 7 to 10 when screen display portions including the display of a plurality of print settings can be switched by using the tab, and batch error display is performed near the tab.

Here, in the present embodiment, each of the first tab 251 and the second tab 252 is an example of a tab. In the present embodiment, each of the first tab setting screen display portion 231 and the second tab setting screen display portion 232 is an example of a screen display portion.

For example, the control section 117 may display the screen illustrated in any one of FIG. 7, 8 or 10 in a case where, when there are prohibition relationships more than a first threshold value between print settings included in a first screen display portion currently being displayed, batch error display is performed near a first tab of the first screen display portion.

For example, the control section 117 may display the screen illustrated in FIG. 9 in a case where, when there are prohibition relationships less than the first threshold value for print settings included in the first screen display portion currently being displayed, batch error display is not performed near the first tab of the first screen display portion, and, when there is a prohibition relationship between print settings included in a second screen display portion currently not being displayed, the batch error display is performed near a second tab of the second screen display portion regardless of the number of print settings having the prohibition relationship.

Here, in the present embodiment, the first tab setting screen display portion 231 having the first tab 251 is an example of the first screen display portion, and the second tab setting screen display portion 232 having the second tab 252 is an example of the second screen display portion.

For example, the control section 117 may display the screen illustrated in any of FIGS. 4 to 7 when individual error display is performed near display of a print setting that enables a prohibition relationship to be solved by changing the minimum number of print settings, and the individual error display is not performed near print settings of which the prohibition relationship can be solved by changing other print settings.

Here, changing of the other print settings is changing of a non-minimum number of print settings. In the present embodiment, the non-minimum number indicates not being a minimum number. Any method may be used as a method for the control section 117 to determine whether or not determination target print settings are changed by changing the minimum number of print settings.

Figure 11:
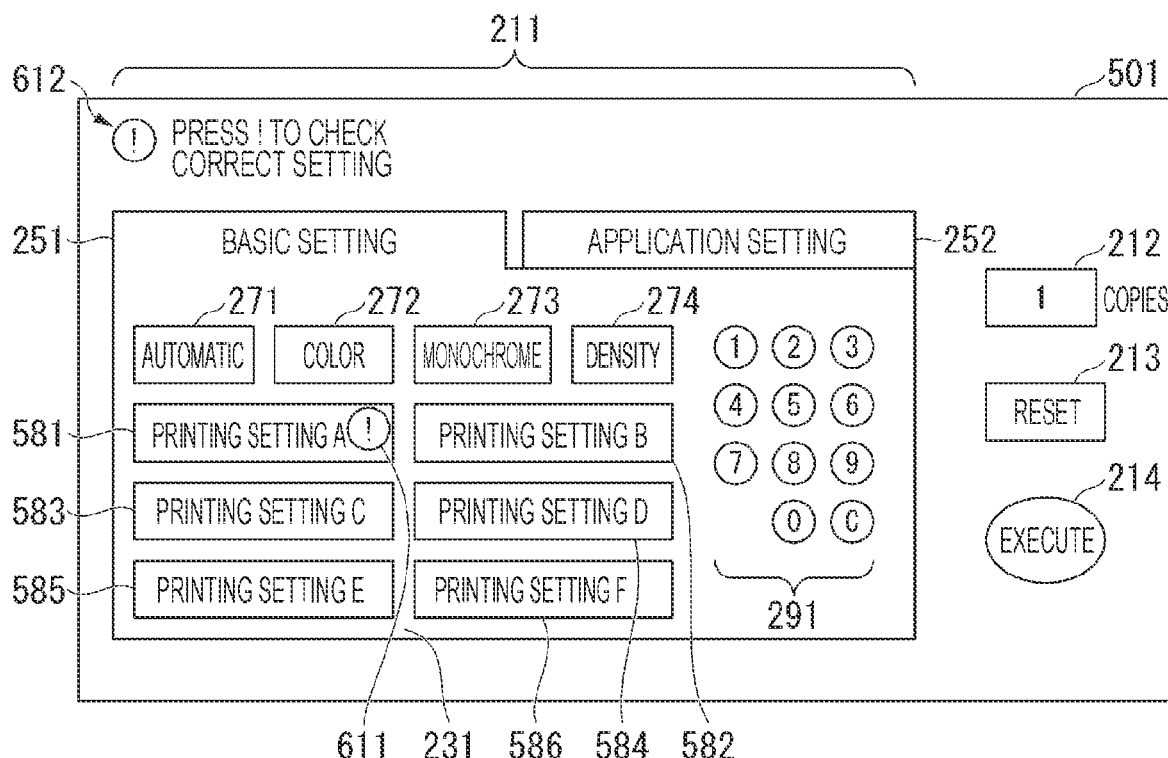
FIG. 11 is a diagram illustrating an example of an eighth display screen of the printing apparatus according to the embodiment.
Figure 12:
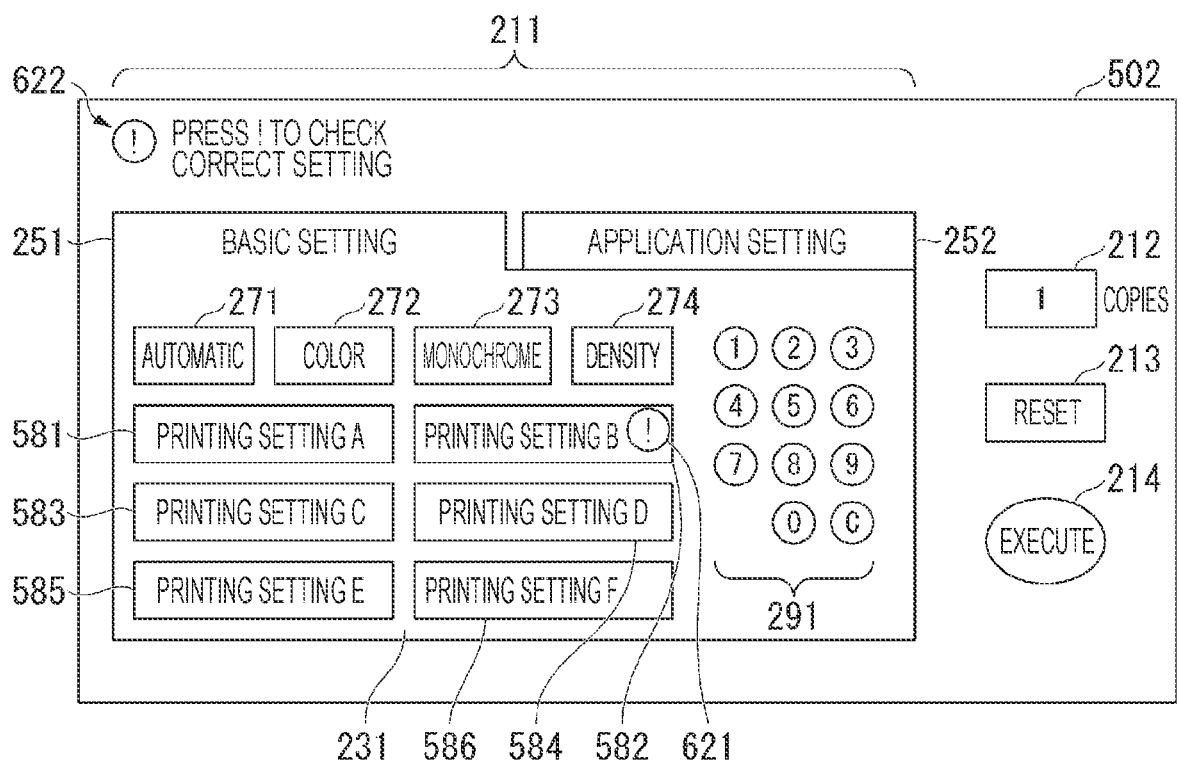
FIG. 12 is a diagram illustrating an example of a ninth display screen of the printing apparatus according to the embodiment.

With reference to FIGS. 11 and 12, an example of an aspect in which an individual error mark is displayed in the printing apparatus 1 will be described.

FIG. 11 is a diagram illustrating an example of an eighth display screen 501 of the printing apparatus 1 according to the embodiment.

FIG. 12 is a diagram illustrating an example of a ninth display screen 502 of the printing apparatus 1 according to the embodiment.

Here, in the examples illustrated in FIGS. 11 to 12, a description will be made of examples of display screens based on the basic display screen 201 illustrated in FIG. 3. Thus, in the examples illustrated in FIGS. 11 to 12, for convenience of description, the same portions as those of the basic display screen 201 illustrated in FIG. 3 will be given the same reference numerals and will be described. Here, in the examples illustrated in FIGS. 11 and 12, for convenience of description, a plurality of print setting display frames in screen display of a selected tab will be respectively referred to as a print setting A display frame 581, a print setting B display frame 582, a print setting C display frame 583, a print setting D display frame 584, a print setting E display frame 585, and a print setting F display frame 586, and print settings corresponding to the print settings A display frame 581 to the print setting F display frame 586 will be respectively referred to as a print setting A to a print setting F.

In the printing apparatus 1, the control section 117 sets print settings including the print setting A, the print setting B, and the print setting C based on an instruction received by the reception section 111, and controls printing according to the set print settings. When the user gives an instruction for an automatic solution to a prohibition relationship, the control section 117 solves the prohibition relationship by using a solution in accordance with the print setting C in a case where the print setting A and the print setting B have a prohibition relationship. That is, when the print setting A, the print setting B, and the print setting C are selected, in a case where the print setting A and the print setting B have a prohibition relationship, the control section 117 determines a print setting for displaying an individual error mark based on a prohibition relationship regarding the print setting C. The user may give an instruction for the automatic solution to the prohibition relationship via a screen displayed by selecting, for example, batch error display.

Here, it is assumed that the print setting A is set to have a higher priority than the print setting B in the printing apparatus 1.

The print setting C may be, for example, a print setting that is required to follow the user's operation on a mechanical mechanism other than a user interface (UI), or may be a print setting that is not required to follow the user's operation on the mechanical mechanism other than the UI.

Here, the print setting that is required to follow the user's operation on the mechanical mechanism other than the UI may be, for example, a print setting in which the user manually replaces the paper stored in the trays 51 to 54 and thus the paper is required to be changed, or a print setting in which the user is required to manually switch states of a predetermined mechanism of the printing apparatus 1.

In the present embodiment, the UI is a user interface such as the reception section 111 and the display section 112.

For example, when the print setting A has a prohibition relationship with the print setting B, and the print setting A has no prohibition relationship with the print setting C, the control section 117 may eliminate the prohibition relationship by changing the print setting B.

For example, when the print setting A has a prohibition relationship with both the print setting B and the print setting C, the control section 117 may eliminate the prohibition relationship by changing the print setting A.

For example, when the print setting A has a prohibition relationship with the print setting B, and does not fall into the prohibition relationship with the print setting C even though the print setting B is changed, the control section 117 may eliminate the prohibition relationship by changing the print setting B.

For example, when the print setting A has a prohibition relationship with the print setting B, and falls into the prohibition relationship with the print setting C in a case where the print setting B is changed, the control section 117 may eliminate the prohibition relationship by changing the print setting A.

When the print setting A has a prohibition relationship with the print setting B, the control section 117 may perform individual error display indicating prohibition near display of one of the print setting A and the print setting B according to the print setting C, and does not need to perform the individual error display near display of the other print setting.

The control section 117 may solve the prohibition relationship by changing a print setting in response to an instruction from the user.

Here, it is preferable that the control section 117 determines, for example, a solution to a prohibition relationship by giving priority to a solution in which there are few procedures for solving a paper mismatch.

For example, when there are a first prohibition solution for solving a prohibition relationship by changing p print settings, p being one or more, and a second prohibition solution for solving the prohibition relationship by changing q print settings, q being more than p, the control section 117 may select the first prohibition solution to solve the prohibition relationship.

As a specific example of the individual error display, when the print setting A and the print setting B have a prohibition relationship and the print setting A and the print setting C have a prohibition relationship, the control section 117 displays an individual error mark in the print setting A, and does not display the individual error mark in the print setting B.

In the example illustrated in FIG. 11, on the eighth display screen 501, a fifth individual error mark 611 is displayed in the print setting A display frame 581 corresponding to the print setting A, and fifth individual error explanation information 612 is displayed.

The fifth individual error mark 611 is an example of an individual error mark.

The fifth individual error explanation information 612 is an example of individual error explanation information.

As another example, when the print setting A and the print setting B have a prohibition relationship, and the print setting A and the print setting C have a prohibition relationship, and the print setting B and the print setting C do not have a prohibition relationship, the control section 117 may display individual error mark in the print setting A, and does not need to display the individual error mark in the print setting B.

As still another example, when the print setting A and the print setting B have a prohibition relationship, and the print setting B and the print setting C do not have a prohibition relationship, the control section 117 may display the individual error mark in the print setting A, and does not need to display the individual error mark in the print setting B.

As a specific example of the individual error display, when the print setting A and the print setting B have a prohibition relationship and the print setting A and the print setting C do not have a prohibition relationship, the control section 117 displays an individual error mark in the print setting B, and does not display the individual error mark in the print setting A.

In the example illustrated in FIG. 12, on a ninth display screen 502, a sixth individual error mark 621 is displayed in the print setting B display frame 582 corresponding to the print setting B, and sixth individual error explanation information 622 is displayed.

The sixth individual error mark 621 is an example of an individual error mark.

The sixth individual error explanation information 622 is an example of individual error explanation information.

As another example, when the print setting A and the print setting B have a prohibition relationship, the print setting B and the print setting C have a prohibition relationship, and the print setting A and the print setting C do not have a prohibition relationship, the control section 117 may display the individual error mark in the print setting B, and does not need to display the individual error mark in the print setting A.

As still another example, when the print setting A and the print setting B have a prohibition relationship, and the print setting B and the print setting C have a prohibition relationship, the control section 117 may display the individual error mark in the print setting B, and does not need to display the individual error mark in the print setting A.

Figure 13:
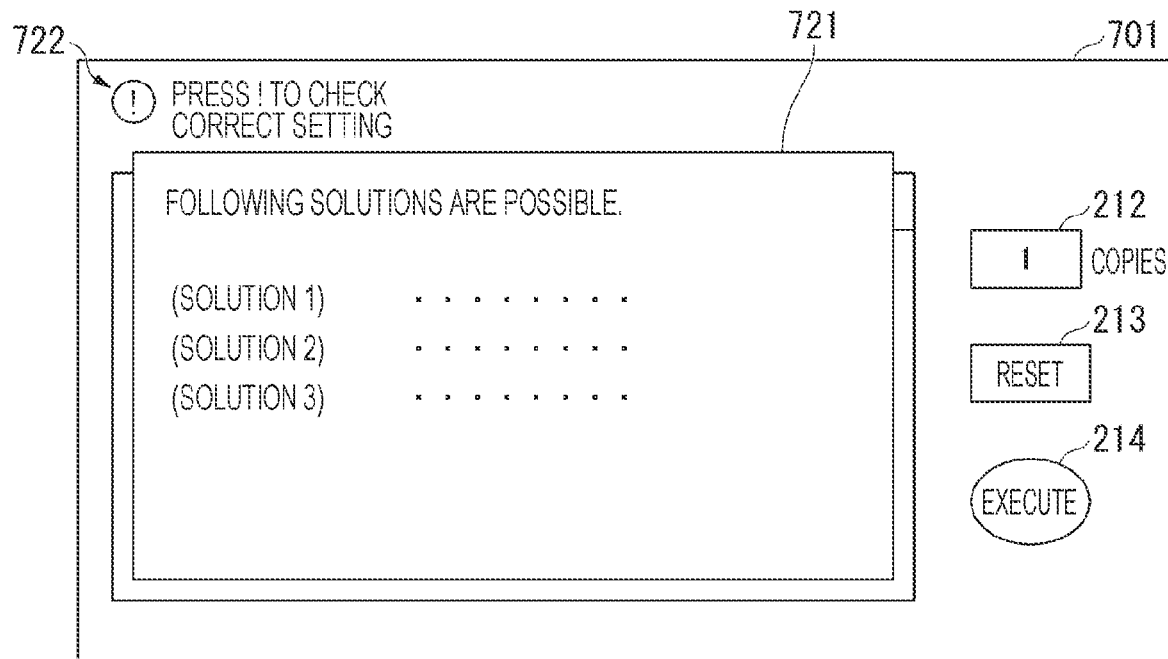
FIG. 13 is a diagram illustrating an example of a tenth display screen of the printing apparatus according to the embodiment.

With reference to FIG. 13, a description will be made of an example of an aspect in which a guidance message is displayed in the printing apparatus 1.

The example illustrated in FIG. 13 is an example of a display screen based on the basic display screen 201 illustrated in FIG. 3. Therefore, in the example illustrated in FIG. 13, for convenience of description, the same portions as those of the basic display screen 201 illustrated in FIG. 3 will be given the same reference numerals and will be description.

In the printing apparatus 1, when an individual error mark is selected, the control section 117 displays a guidance message corresponding to the selected individual error mark on the screen.

Here, in the present embodiment, the control section 117 determines that the individual error mark is selected when the individual error mark is clicked or the like in response to an operation performed by the user.

The guidance message includes information regarding a solution for solving a paper mismatch related to the selected individual error mark.

FIG. 13 is a diagram illustrating an example of a tenth display screen 701 of the printing apparatus 1 according to the embodiment.

A guidance message frame 721 is displayed in a pop-up form on the tenth display screen 701.

Information regarding the guidance message is displayed in the guidance message frame 721.

The information regarding the guidance message includes, for example, explanations of one or more solutions. In the example illustrated in FIG. 13, explanation information for a solution 1, a solution 2, and a solution 3 is displayed.

In the example illustrated in FIG. 13, the selected individual error mark is hidden by the guidance message frame 721.

In the example illustrated in FIG. 13, seventh individual error explanation information 722 is displayed.

The seventh individual error explanation information 722 is an example of individual error explanation information.

In the present embodiment, in the printing apparatus 1, when one solution is selected from among the solutions displayed as the guidance message information, the control section 117 executes a process corresponding to the solution.

Here, in the present embodiment, the control section 117 determines that the solution has been selected when a portion corresponding to the solution is clicked or the like in response to an operation performed by the user.

Although the guidance message displayed when the individual error mark is selected has been described here, in the printing apparatus 1, the control section 117 may similarly display a guidance message for a batch error mark.

A method in which the control section 117 of the printing apparatus 1 determines a solution for solving a paper mismatch will be described.

In the printing apparatus 1, the control section 117 performs, for example, a process of determining one or more solutions to be included in the guidance message, or a process of determining one solution to be automatically executed.

In the present embodiment, in the printing apparatus 1, the control section 117 determines a solution having few procedures until a paper mismatch is solved, in preference to a solution having more procedures. As a solution in which the number of procedures until the paper mismatch is solved is small, for example, it is preferable to use a solution in which the number of procedures is the minimum.

A specific example will be described.

In the printing apparatus 1, the control section 117 determines a solution based on a master-slave relationship between the trays 51 to 54 and a priority of a print setting.

That is, the control section 117 determines the master-slave relationship between the trays 51 to 54.

Here, regarding the paper mismatch case 4, for example, the master-slave relationship between the trays 51 to 54 may be set in advance according to the functional specifications, or the control section 117 may determine the master-slave relationship between the trays 51 to 54.

As a method for determining the master-slave relationship between the trays 51 to 54, for example, a method of determining the master-slave relationship between the trays 51 to 54 based on the frequency of use of paper stored in each of the trays 51 to 54 may be used.

For example, when a plurality of trays 51 to 54 storing paper with the same size and of the same type, the control section 117 sets the uppermost tray as a master tray and sets the trays below the tray as slave trays, based on such arrangement of the trays. The control section 117 may set two or more slave trays, or when there are two or more slave tray candidates, may set one slave tray by setting a tray closest to the master tray as the slave tray.

When a paper mismatch has occurred and there is a master-slave relationship between trays 51 to 54 with respect to the paper mismatch, the control section 117 preferentially determines a solution for solving the paper mismatch of the master tray. In this case, the control section 117 determines whether or not the paper mismatch of the master tray and the paper mismatch of the slave tray can be solved together, and preferentially determines a solution for solving the paper mismatch of the master tray and the paper mismatch of the slave tray together. Consequently, in the printing apparatus 1, it is possible to reduce processes performed by the printing apparatus 1 or a labor of operations performed by the user in order to solve the paper mismatch.

When a paper mismatch has occurred and the trays 51 to 54 do not have a master-slave relationship with respect to the paper mismatch, the control section 117 preferentially determines a solution for solving a paper mismatch related to an item having a higher priority according to a predetermined priority condition for print settings other than a paper setting. In this case, the control section 117 preferentially determines a solution for simultaneously solving paper mismatches for a plurality of print settings for which the paper mismatches have occurred.

Here, various processes may be used as a process of solving a prohibition relationship in the control section 117.

For example, when the user gives an instruction for automatically eliminating the prohibition relationship, the following processes 1 to 3 may be executed in response to the instruction.

The process 1 is a process of determining priorities of print settings based on statuses of consumables and solving a prohibition relationship by changing a print setting having a lower priority. This process is a process that gives a priority to a print setting that saves consumables, such as a print setting of duplex or a print setting of 4UP printing, when an amount of a consumable such as paper or ink is small.

The process 2 is a process of determining priorities of print settings based on a contract status and solving a prohibition relationship by changing a print setting having a lower priority. This process is a process that gives a priority to a print setting that saves the number of sheets of paper, such as a print setting of duplex or a print setting of 4UP printing, for example, when the number of printable sheets of paper does not have a margin for the contracted upper limit number of sheets of paper.

The contract status may be, for example, a status of contract conditions regarding use defined by a lease contract or a support contract for the printing apparatus 1.

The process 3 is a process of determining a priority according to the number of changes in print settings required to solve a prohibition relationship, and solving the prohibition relationship by changing a print setting having a lower priority. In this process, for example, in a case where, when one print setting is changed, the number of changes in print settings required to solve the prohibition relationship, is the smallest, the prohibition relationship is solved by performing changes that make the print setting have the lowest priority and that minimize the number of changes in the print settings required to solve the prohibition relationship.

In the printing apparatus 1, a process to be employed may be fixed to a single process that is set in advance, for example, or may be determined by the control section 117 according to a state of the printing apparatus.

As a specific example, processes 4 to 7 for solving a prohibition relationship without the user giving an instruction for automatically eliminating the prohibition relationship will be described.

The process 4 is a process with the last selected print setting as a reference based on the order of operations performed by the user when a print setting is selected through the operations performed by the user. This process is a process in which the print setting selected last is preferentially employed, and is a so-called after-win condition process. The selection of print settings may include, for example, a case where a new print setting is selected and a case where a print setting is selected such that details of a print setting already selected are changed.

Specifically, in the process 4, for example, the previous instruction that is prohibited from being combined with the instruction received later is canceled.

The process 5 is a process with a print setting first selected as a reference based on the order of operations performed by the user when the print setting is selected through the operations performed by the user. This process is a process in which the print setting selected first is preferentially employed, and is a so-called first-win condition process. For example, when there is a break in a series of operations performed by the user, the next operation may be regarded as a first operation for each break.

Specifically, in the process 5, for example, the future instruction that is prohibited from being combined with the instruction received earlier is not received.

The process 6 is a process in which priorities of all the print settings are predefined, and the print settings having a higher priority are prioritized according to the priorities. The process is a process of a defined priority condition. The priorities may be determined as appropriate, and may be given to the order of the processes 1 to 3. Alternatively, the priorities may be determined according to a screen display order.

Specifically, in the process 6, when an instruction that is prohibited from being combine with a received instruction and has a low priority has already been received, the instruction is canceled, and an instruction that is prohibited from being combined with the received instruction and has a low priority is prohibited from being received after the received instruction.

The process 7 is a process of presenting print setting candidates to the user and employing a candidate selected by the user. The process is a process of a user determination condition. Here, the candidates presented to the user may be, for example, all available candidates, or may be some of the available candidates that are automatically selected according to any of the above conditions.

In the process 7, for example, a plurality of candidates may be presented for a combination of instructions for releasing a combination of prohibited instructions, and the user may select a candidate.

The process 7 may be used, for example, in a process after a guidance is provided by presenting candidates for print settings.

The process 7 may be used, for example, when the user's permission or rejection is repeated for automatic correction of print setting performed by the printing apparatus 1.

Here, in the printing apparatus 1, for example, in a case where a combination of two or more print settings has a prohibition relationship, the control section 117 may use a predetermined priority condition when a print setting to be employed is determined among these print settings. For example, the control section 117 may use any of the processes 4 to 7 of print setting priority conditions as the predetermined priority condition.

in the printing apparatus 1, the control section 117 may use either a process based on any of the processes 4 to 7 of the print setting priority conditions, or a process related to a solution for displaying print settings having a prohibition relationship in an identifiable manner. Here, as an aspect of displaying the print settings having a prohibition relationship in an identifiable manner, for example, an aspect in which one or both of individual error display and batch error display are performed may be used.

A specific example will be described.

In the printing apparatus 1, the control section 117 may solve a prohibition relationship between print settings according to different solutions depending on a state of the printing apparatus 1. For example, the control section 117 may switch print setting priority conditions according to a predetermined state of the printing apparatus 1 to automatically solve the prohibition relationship between the print settings.

For example, in the printing apparatus 1, the control section 117 may switch from a process out of a plurality of processes to another process according to a state of the printing apparatus 1, the plurality of processes including a process of canceling the previous instruction that is prohibited from being combined with an instruction received later, a process of not receiving a future instruction that is prohibited from being combined with the instruction received earlier, a process of canceling an instruction when the instruction that is prohibited from being combine with a received instruction and has a low priority has already been received, and prohibiting an instruction that is prohibited from being combined with the received instruction and has a low priority from being received after the received instruction, a process of presenting a plurality of candidates for a combination of instructions for releasing a combination of prohibited instructions, and allowing a user to select a candidate, and a process of displaying print settings having a prohibition relationship in an identifiable manner. Any two of the above processes may be switched to each other according to a state of the printing apparatus 1.

Here, any state may be used as the predetermined state of the printing apparatus 1, for example, one or more of an amount of ink, an amount of paper, a size of paper, the type of paper, a state related to a printing medium other than paper, a state of a power supply, a state related to a user's instruction, a state related to contract conditions, a state related to a predetermined mechanism, and the like may be used.

As the state of the power supply, for example, an ON/OFF state of the power supply may be used, or when the power supply is a battery, a residual quantity of the battery may be used.

As the contract conditions, for example, contract conditions regarding the use of the printing apparatus 1, such as the remaining number of printable sheets of paper of the printing apparatus 1 for this month may be used. Information regarding such contract conditions may be stored in the ROM 152 in the printing apparatus 1 or may be acquired from a contract management server via a network.

As the predetermined mechanism, for example, a mechanical switching mechanism that is included in the printing apparatus 1 and cannot be automatically switched may be used.

For example, in the printing apparatus 1, the control section 117 may solve the prohibition relationship between the print settings according to different solutions depending on a state related to at least one of ink and a printing medium used in the printing apparatus 1. Specifically, when the ink and the printing medium used in the printing apparatus 1 are sufficient, the control section 117 employs a candidate selected by the user according to the process 7, and when the ink or the printing medium used in the printing apparatus 1 is insufficient, the control section 117 employs a print setting that reduces amounts of ink and printing medium to be used according to the process 6 as a print setting having a high priority. Consequently, the control section 117 eliminates the prohibition relationship.

For example, when the printing apparatus 1 includes a battery, the control section 117 may solve the prohibition relationship between the print settings according to different solutions depending on a state related to a residual quantity of the battery of the printing apparatus 1.

For example, in the printing apparatus 1, the control section 117 may solve the prohibition relationship between the print settings according to different solutions depending on a state related to the number of times of the same instruction being repeated with respect to the user's instruction. As an example, the control section 117 may switch the print setting priority conditions according to the number of times of the print settings being changed in response to an operation performed by the user.

For example, in the printing apparatus 1, the control section 117 may solve the prohibition relationship between the print settings according to different solutions depending on a state related to the contract conditions regarding the use of the printing apparatus 1.

For example, in the printing apparatus 1, the control section 117 may solve the prohibition relationship between the print settings according to different solutions depending on a state of the mechanical switching mechanism that is included in the printing apparatus 1 and cannot automatically perform switching.

As an example of the prohibition relationship, when 2UP printing is performed as the print setting of page aggregation in the printing apparatus 1, the print setting of magnification is required to be automatically calculated. The print setting of 2UP printing is a print setting for printing images of two original documents on one sheet of paper in the page aggregation. In a case where 100% magnification is selected through the user's operation when 2UP printing is performed, there is a probability that omission may occur in a printing result depending on a size of an original document.

The control section 117 may automatically solve such a prohibition relationship.

In a case where the print setting priority process 4 is used, when, through the user's operation, the print setting of page aggregation for 2UP printing is first selected, and then the print setting of 100% magnification is selected, the control section 117 employs the print setting of 100% magnification that is the last selected print setting. The control section 117 changes the print setting of page aggregation to 1UP printing in order to change other print settings with the employed print setting as a reference. The print setting of 1UP printing is a print setting for printing an image of one original document on one sheet of paper.

In a case where the print setting priority process 5 is used, when, through the user's operation, the print setting of page aggregation for 2UP printing is first selected, and then the print setting of 100% magnification is selected, the control section 117 employs the print setting of page aggregation for 2UP printing that is the first selected print setting. The control section 117 changes the print setting of magnification to automatic calculation in order to change other print settings with the employed print setting as a reference.

In a case where the print setting priority process 6 is used, when, through the user's operation, the print setting of page aggregation for 2UP printing is first selected, and then the print setting of 100% magnification is selected, the control section 117 employs a print setting having a higher priority according to predetermined priorities. In this case, the control section 117 follows a predetermined priority instead of following the order of operations performed by the user.

In a case where the print setting priority process 7 is used, when a prohibition relationship between the print setting of page aggregation for 2UP printing and the print setting of 100% magnification occurs, the control section 117 displays a combination of the print setting of page aggregation for 2UP printing and the print setting of automatic calculation magnification and a combination of the print setting of page aggregation for 1UP printing and the print setting of 100% magnification, on the screen as two options. The control section 117 employs an option selected according to an operation performed by the user of the two options.

Here, when there are a plurality of conditions that can be used as the print setting priority conditions, the control section 117 may select and apply one condition based on a predetermined state of the printing apparatus 1. Various states may be used as a state of the printing apparatus 1.

As a specific example, a determination condition 1 based on the state of the printing apparatus 1 to a determination condition 3 based on the state of the printing apparatus 1 will be described.

The determination condition 1 based on the state of the printing apparatus 1 is a determination condition for determining that a predetermined condition in consideration of paper saving is used as a print setting priority condition when a remaining amount of the predetermined paper is small. In the printing apparatus 1, the predetermined condition is set in advance, for example. Here, as a method of determining whether or not a remaining amount of the predetermined paper is small, for example, a method of determining that a remaining amount of the predetermined paper is small when the remaining amount of the predetermined paper is equal to or less than a predetermined threshold value may be used. As the threshold value, for example, a value of ⅕ of the maximum amount of the paper that can be stored in the trays 51 to 54 may be used.

In the present embodiment, in the printing apparatus 1, the control section 117 acquires information regarding an amount of paper detected by the paper amount detection portion 131 for each of the trays 51 to 54.

The determination condition 2 based on the state of the printing apparatus 1 is a determination condition for performing determination such that the print setting of paper setting is prioritized because there are many restrictions depending on paper when there is only predetermined dedicated paper.

In the present embodiment, in the printing apparatus 1, the control section 117 acquires information regarding the paper type detected by the paper type detection portion 133 for each of the trays 51 to 54.

The determination condition 3 based on the state of the printing apparatus 1 is a determination condition for determining that a print setting corresponding to an operation performed by the user is used afterward because the user's intention is difficult to predict in a case where alteration based on the user's operation is performed more than a predetermined number of times when the printing apparatus 1 automatically performs correction for changing a print setting. The predetermined number of times may be, for example, three times.

As an example, fundamentally, the control section 117 uses either the after-win condition process that is the print setting priority process 4 or the first-win condition process that is the print setting priority process 5. Here, a condition to be used in the printing apparatus 1 may be determined in advance, or the conditions may be switched by the control section 117 based on predetermined information.

When it is determined that a remaining amount of the predetermined paper is small with respect to the determination condition 1 based on the state of the printing apparatus 1, or determines that there is only predetermined dedicated paper with respect to the determination condition 2 based on the state of the printing apparatus 1, the control section 117 uses a process of a defined priority condition that is the print setting priority process 6.

In a case where it is determined that alteration based on the user's operation is performed more than a predetermined number of times when the printing apparatus 1 automatically performs correction for changing a print setting with respect to the determination condition 3 based on the state of the printing apparatus 1, the control section 117 uses a process of a user determination condition that is the print setting priority process 7.

Figure 14:
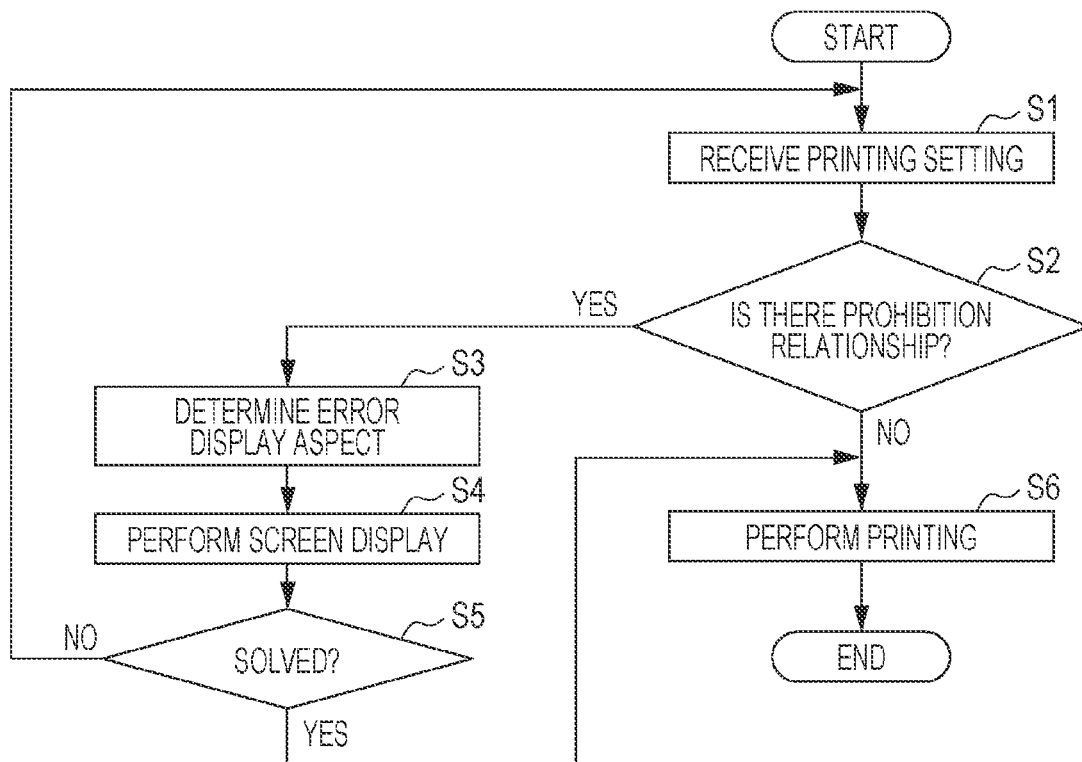
FIG. 14 is a diagram illustrating examples of process procedures performed in the printing apparatus according to the embodiment.
Figure 15:
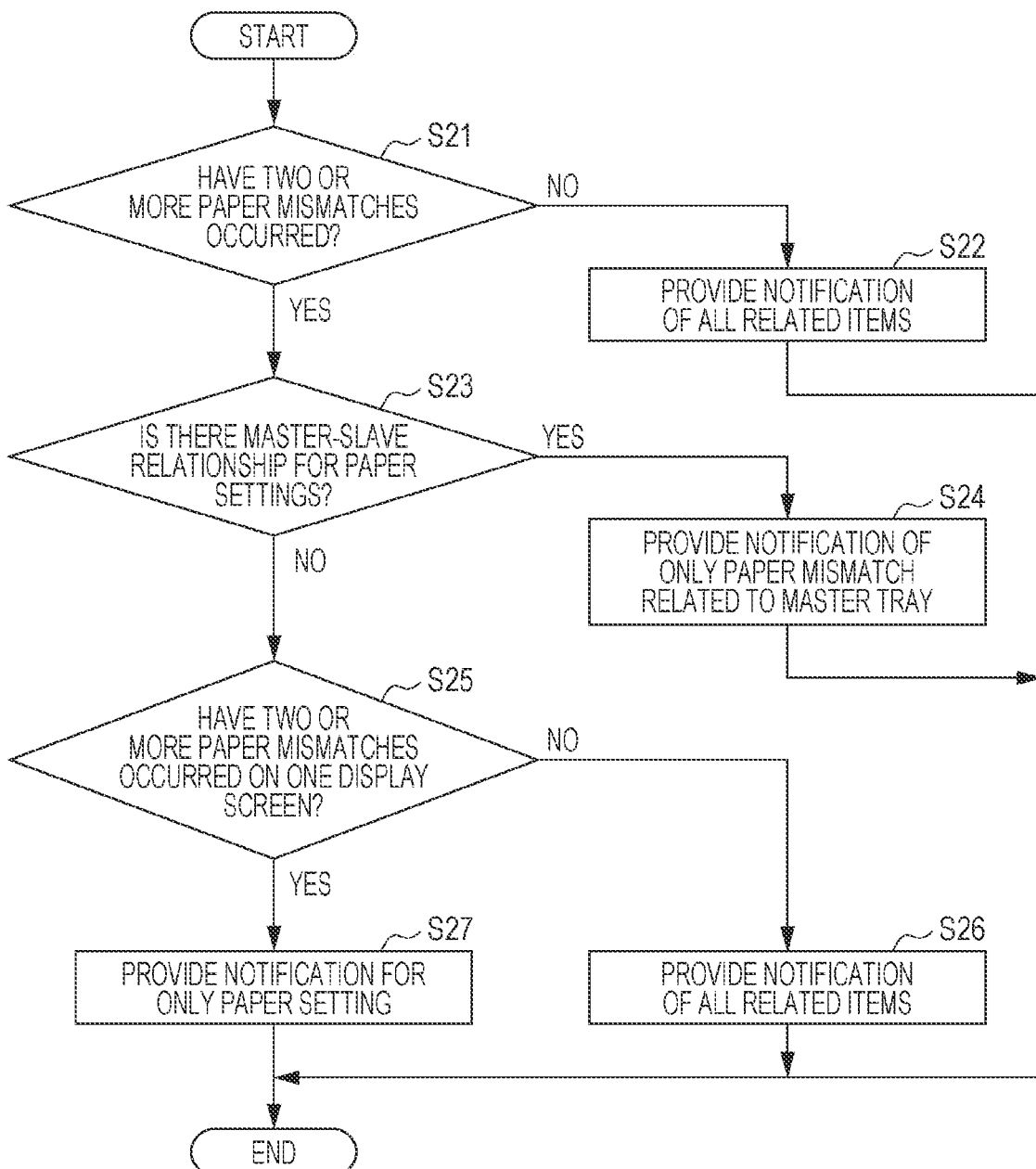
FIG. 15 is a diagram illustrating examples of process procedures performed in the printing apparatus according to the embodiment.

With reference to FIGS. 14 to 15, as an example of a process performed in the printing apparatus 1 according to the embodiment, an example of a process of displaying an error related to a prohibition relationship between the print settings will be described.

FIG. 14 is a diagram illustrating examples of process procedures performed in the printing apparatus 1 according to the embodiment. The present flow is called when the user selects to use a copy function on a home screen of the printing apparatus 1.

For convenience of description, the process procedures in the present flow will be referred to as steps S1 to S6.

In step S1, in the printing apparatus 1, the control section 117 receives one or more print settings. In the printing apparatus 1, the flow proceeds to step S2.

Here, the control section 117 may receive the print settings according to, for example, an operation performed by the user, or may receive the print settings according to a preset setting.

In step S2, in the printing apparatus 1, the control section 117 determines whether or not a prohibition relationship has occurred with respect to the plurality of set print settings.

As a result of the determination, in the printing apparatus 1, when the control section 117 determines that the prohibition relationship has occurred, the result is YES in step S2, and the flow proceeds to step S3.

On the other hand, in the printing apparatus 1, when the control section 117 determines that the prohibition relationship has not occurred, the result is NO in step S2, and the flow proceeds to step S6.

Here, the control section 117 determines the prohibition relationship based on, for example, information defining prohibition conditions stored in the ROM 152 or the RAM 153 in advance.

In step S3, in the printing apparatus 1, the control section 117 determines an aspect of error display according to details of the prohibition relationship based on the determination result of the prohibition relationship. In the printing apparatus 1, the flow proceeds to step S4.

Here, the aspect of error display includes, for example, one or both of an aspect of displaying an individual error mark and an aspect of displaying a batch error mark. In the present embodiment, when a plurality of paper mismatches occur, the control section 117 displays both the individual error mark and the batch error mark, but may display either one as another configuration example.

In step S4, in the printing apparatus 1, the control section 117 displays a screen in the determined aspect. In the printing apparatus 1, the flow proceeds to step S5.

In step S5, in the printing apparatus 1, the control section 117 determines whether or not the prohibition relationship has been solved.

In the printing apparatus 1, when the control section 117 determines that the prohibition relationship has been solved as a result of the determination, the result is YES in step S5, and the flow proceeds to step S6.

On the other hand, in the printing apparatus 1, when the control section 117 determines that the prohibition relationship has not been solved as a result of the determination, the result is NO in step S5, and the flow proceeds to step S1.

Here, for example, the prohibition relationship is solved by the user manually changing the print settings, and thus the control section 117 determines that the prohibition relationship has been solved. The control section 117 may automatically determine a method for solving the prohibition relationship and guide the user to the solution.

In step S6, in the printing apparatus 1, the control section 117 performs printing according to the print settings in a state where there is no prohibition relationship. The printing apparatus 1 finishes the process in the present flow. In this case, for example, the printing apparatus 1 returns to a state of the home screen.

In the present flow illustrated in FIG. 14, when a state in which the prohibition relationship is not solved continues for a predetermined time, the control section 117 may be configured to finish the process in the present flow as a timeout.

FIG. 15 is a diagram illustrating examples of process procedures performed in the printing apparatus 1 according to the embodiment.

Here, the flow illustrated in FIG. 15 may be used, for example, in the process in step S3 illustrated in FIG. 14.

For convenience of description, the process procedures in the present flow will be referred to as steps S21 to S27.

In this example, a case where one or more paper mismatches have occurred in the printing apparatus 1 will be described.

In step S21, in the printing apparatus 1, the control section 117 determines whether or not two or more paper mismatches have occurred.

In the printing apparatus 1, when the control section 117 determines that one paper mismatch has occurred as a result of the determination, the result is NO in step S21, and the flow proceeds to step S22.

On the other hand, in the printing apparatus 1, when the control section 117 determines that two or more paper mismatches have occurred as a result of the determination, the result is YES in step S21, and the flow proceeds to step S23.

In step S22, in the printing apparatus 1, the control section 117 determines to provide a notification of all related items regarding the one paper mismatch that has occurred. The printing apparatus 1 finishes the process in the present flow.

In step S23, in the printing apparatus 1, the control section 117 determines whether or not the trays 51 to 54 have a master-slave relationship for paper settings.

In the printing apparatus 1, when the control section 117 determines that there is a master-slave relationship as a result of the determination, the result is YES in step S23, and the flow proceeds to step S24.

On the other hand, in the printing apparatus 1, when the control section 117 determines that there is no master-slave relationship as a result of the determination, the result is NO in step S23, and the flow proceeds to step S25.

In step S24, in the printing apparatus 1, the control section 117 determines to provide a notification of only the paper mismatch related to a master tray. The printing apparatus 1 finishes the process in the present flow.

In step S25, in the printing apparatus 1, the control section 117 determines whether or not two or more paper mismatches have occurred in one display screen.

In the printing apparatus 1, when the control section 117 determines that one paper mismatch has occurred in one display screen as a result of the determination, the result is NO in step S25, and the flow proceeds to step S26.

On the other hand, in the printing apparatus 1, when the control section 117 determines that two or more paper mismatches have occurred in one display screen, the result is YES in step S25, and the flow proceeds to step S27.

In step S26, in the printing apparatus 1, when one paper mismatch has occurred in one display screen, the control section 117 determines to provide a notification of all the related items regarding the paper mismatch. The printing apparatus 1 finishes the process in the present flow.

In step S27, in the printing apparatus 1, when two or more paper mismatches have occurred in one display screen, the control section 117 determines to provide a notification of only the paper setting. The printing apparatus 1 finishes the process in the present flow.

With reference to FIGS. 16 to 21, as examples of processes performed in the printing apparatus 1 according to the embodiment, a description will be made of a process of determining a solution for solving a prohibition relationship between the print settings and a process of solving the prohibition relationship between the print settings according to the determined solution.

When a flow proceeds to a procedure in which work required to be performed by the user is performed, such as changing paper stored in each of the trays 51 to 54, or changing a state of a predetermined mechanism in the printing apparatus 1, a description will be made assuming that the work is performed by the user.

Figure 16:
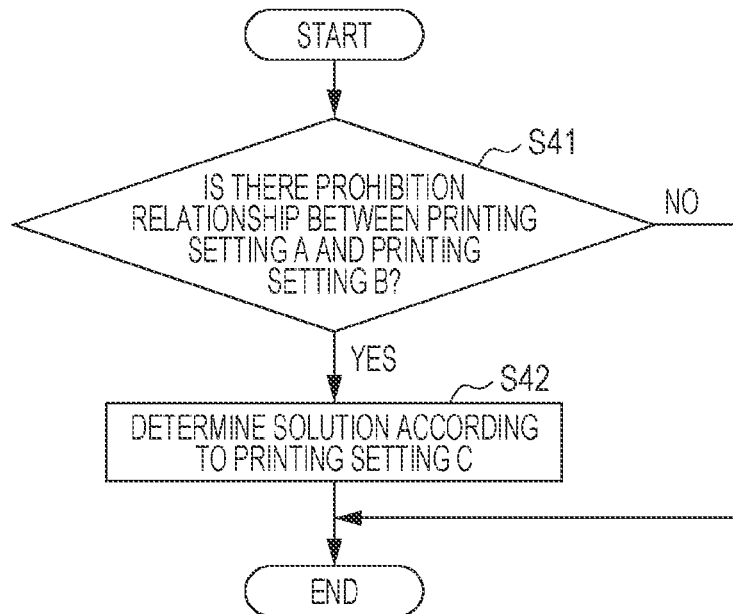
FIG. 16 is a diagram illustrating examples of process procedures performed in the printing apparatus according to the embodiment.

FIG. 16 is a diagram illustrating examples of process procedures performed in the printing apparatus 1 according to the embodiment.

Here, a flow illustrated in FIG. 16 may be used, for example, in the process in step S5 illustrated in FIG. 14.

For convenience of description, the process procedures in the present flow will be referred to as steps S41 to S42.

In this example, the print setting A, the print setting B, and the print setting C will be described as examples. For example, the print setting A and the print setting B may have a master-slave relationship.

In step S41, in the printing apparatus 1, the control section 117 determines whether or not the print setting A and the print setting B have a prohibition relationship.

In the printing apparatus 1, when the control section 117 determines that the print setting A and the print setting B do not have the prohibition relationship as a result of the determination, the result is NO in step S41, and the process in the present flow is finished.

On the other hand, in the printing apparatus 1, when the control section 117 determines that the print setting A and the print setting B have the prohibition relationship as a result of the determination, the result is YES in step S41, and the flow proceeds to step S42.

In step S41, in the printing apparatus 1, the control section 117 determines a solution to the prohibition relationship for the print setting A and the print setting B according to the print setting C. The printing apparatus 1 finishes the process in the present flow.

Figure 17:
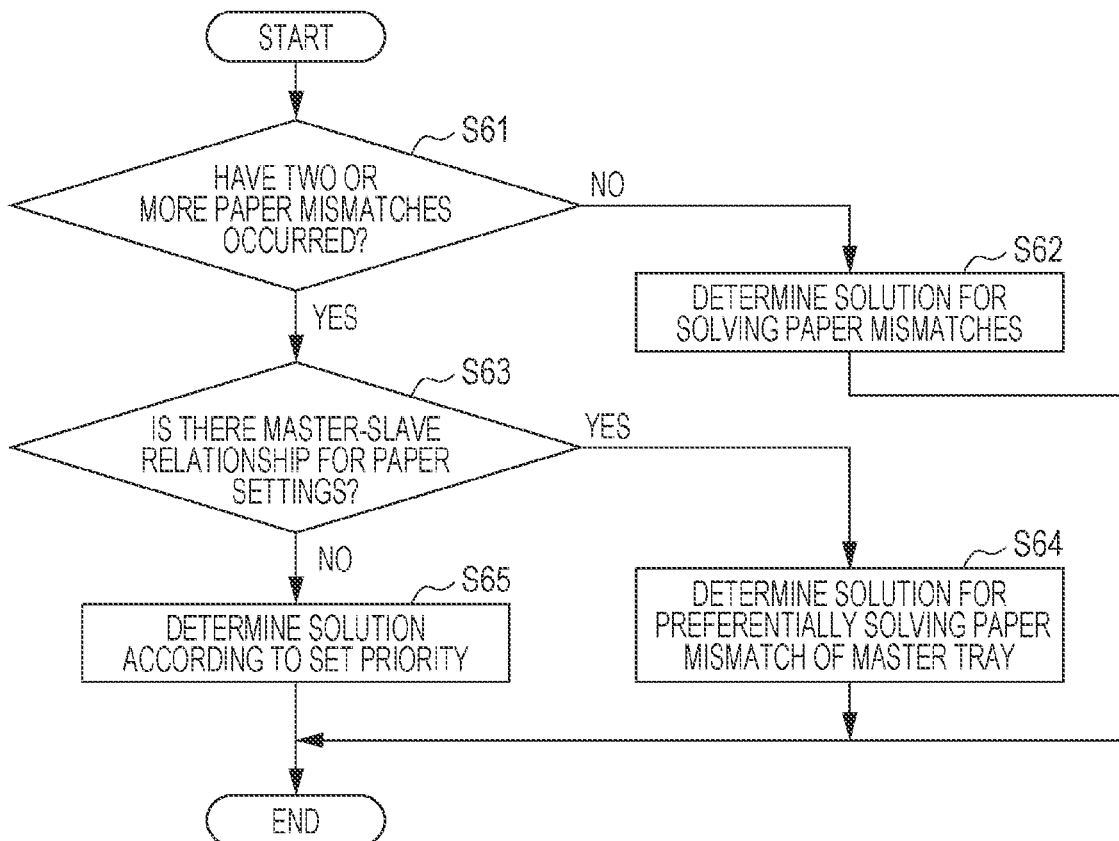
FIG. 17 is a diagram illustrating examples of process procedures performed in the printing apparatus according to the embodiment.

FIG. 17 is a diagram illustrating examples of process procedures performed in the printing apparatus 1 according to the embodiment.

Here, a flow illustrated in FIG. 17 may be used as a specific example of the flow illustrated in FIG. 16, for example. In this case, the print setting A and the print setting B in the example illustrated in FIG. 16 may have a master-slave relationship between paper settings, and when the master-slave relationship occurs, as a process of preferentially solving a paper mismatch of the master tray, a process is performed in consideration of another print setting C.

For convenience of description, the process procedures in the present flow will be referred to as steps S61 to S65.

In this example, a case where one or more paper mismatches have occurred in the printing apparatus 1 will be described.

In step S61, in the printing apparatus 1, the control section 117 determines whether or not two or more paper mismatches have occurred.

In the printing apparatus 1, when the control section 117 determines that one paper mismatch has occurred as a result of the determination, the result is NO in step S61, and the flow proceeds to step S62.

On the other hand, in the printing apparatus 1, when the control section 117 determines that two or more paper mismatches have occurred as a result of the determination, the result is YES in step S61, and the flow proceeds to step S63.

In step S62, in the printing apparatus 1, when one paper mismatch has occurred, the control section 117 determines a solution for solving the corresponding paper mismatch. The printing apparatus 1 finishes the process in the present flow.

Here, the solution may be, for example, a solution for changing to paper that does not cause a prohibition relationship.

In step S63, in the printing apparatus 1, the control section 117 determines whether or not the trays 51 to 54 have a master-slave relationship between paper settings.

In the printing apparatus 1, when the control section 117 determines that there is a master-slave relationship as a result of the determination, the result is YES in step S63, and the flow proceeds to step S64.

On the other hand, in the printing apparatus 1, when the control section 117 determines that there is no master-slave relationship as a result of the determination, the result is NO in step S63, and the flow proceeds to step S65.

In step S64, in the printing apparatus 1, the control section 117 determines a solution for preferentially solving a paper mismatch of the master tray. The printing apparatus 1 finishes the process in the present flow.

In step S65, in the printing apparatus 1, the control section 117 determines the solution according to a set priority. The printing apparatus 1 finishes the process in the present flow.

Figure 18:
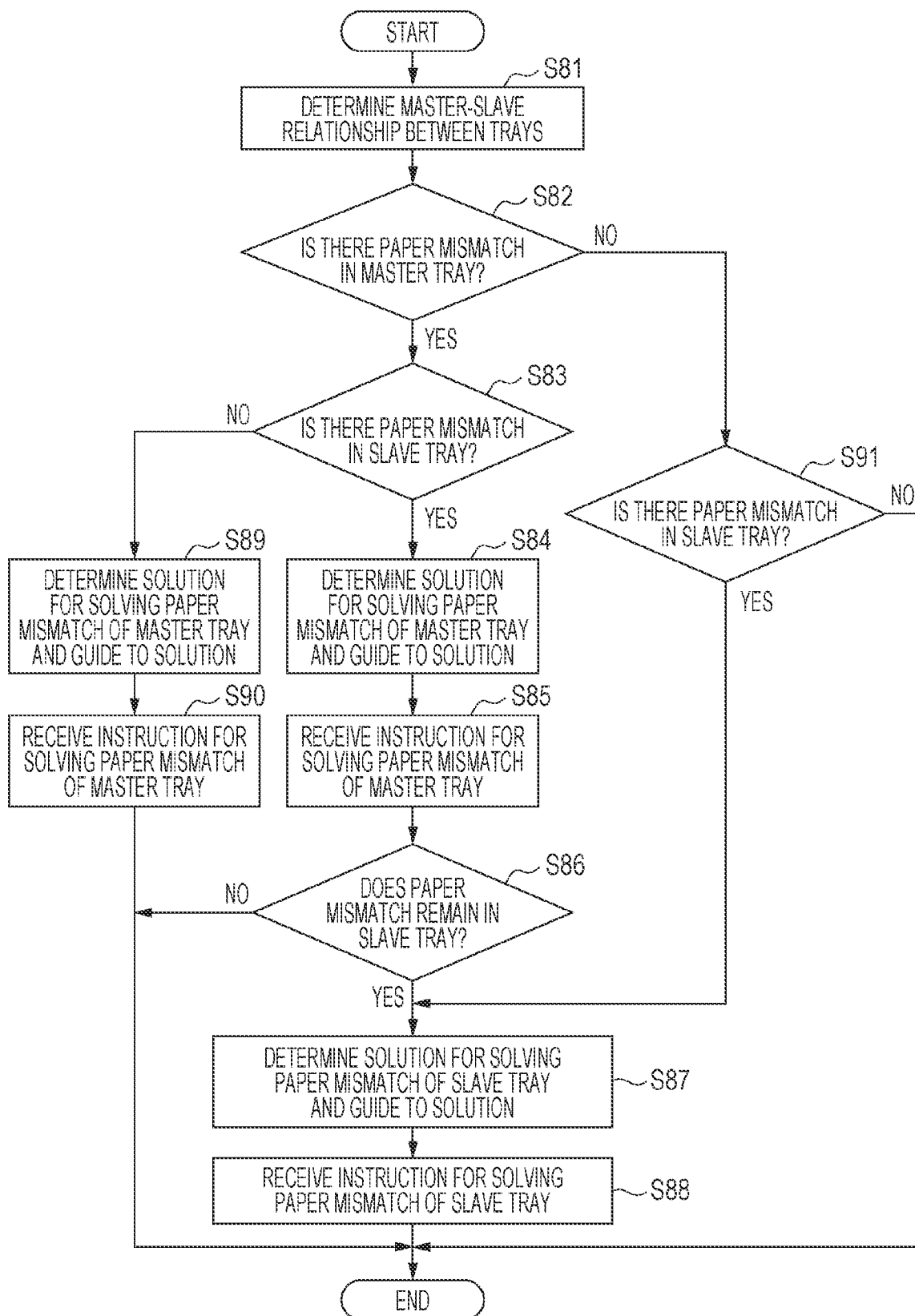
FIG. 18 is a diagram illustrating examples of process procedures performed in the printing apparatus according to the embodiment.

FIG. 18 is a diagram illustrating examples of process procedures performed in the printing apparatus 1 according to the embodiment.

Here, the flow illustrated in FIG. 18 may be used, for example, in the process in step S64 illustrated in FIG. 17. In the example illustrated in FIG. 18, a description will be made of a case where bookbinding printing is possible in the printing apparatus 1 and the user performs the bookbinding printing. In the present embodiment, in bookbinding printing, the text is printed using plain paper in the master tray, and the cover is printed using colored paper in the slave tray. A paper size of the master tray and ae paper size of the slave tray are required to be set to the same size.

For convenience of description, the process procedures in the present flow will be referred to as steps S81 to S91.

In this example, in the printing apparatus 1, a description will be made of a case where, among the trays 51 to 54, two trays storing paper related to a paper mismatch have a master-slave relationship.

In step S81, in the printing apparatus 1, the control section 117 determines a master-slave relationship between the trays 51 to 54. In the printing apparatus 1, the flow proceeds to step S82.

In step S82, in the printing apparatus 1, the control section 117 determines whether or not there is a paper mismatch in a master tray.

As a result of the determination, in the printing apparatus 1, when the control section 117 determines that there is a paper mismatch in the master tray, the result is YES in step S82, and the flow proceeds to step S83.

On the other hand, in the printing apparatus 1, when the control section 117 determines that there is no paper mismatch in the master tray as a result of the determination, the result is NO in step S82, and the flow proceeds to step S91.

In step S83, in the printing apparatus 1, the control section 117 determines whether or not there is a paper mismatch in a slave tray.

In the printing apparatus 1, when the control section 117 determines that there is a paper mismatch in the slave tray as a result of the determination, the result is YES in step S83, and the flow proceeds to step S84.

On the other hand, in the printing apparatus 1, when the control section 117 determines that there is no paper mismatch in the slave tray as a result of the determination, the result is NO in step S83, and the flow proceeds to step S89.

In step S84, in the printing apparatus 1, the control section 117 determines a solution for solving the paper mismatch of the master tray, and guides the user to the determined solution. In the printing apparatus 1, the flow proceeds to step S85.

In step S85, the user performs an operation of giving an instruction for determining a solution to the printing apparatus 1 with reference to the guidance. Consequently, in the printing apparatus 1, the control section 117 receives the instruction for solving the paper mismatch of the master tray according to the determined solution, and solves the paper mismatch of the master tray. In the printing apparatus 1, the flow proceeds to step S86.

In step S86, in the printing apparatus 1, the control section 117 determines whether or not a paper mismatch remains in the slave tray.

In the printing apparatus 1, when the control section 117 determines that a paper mismatch remains in the slave tray as a result of the determination, the result is YES in step S86, and the flow proceeds to step S87.

On the other hand, in the printing apparatus 1, when the control section 117 determines that there is no paper mismatch remaining in the slave tray as a result of the determination, the result is NO in step S86, and the process in the present flow is finished.

In step S87, in the printing apparatus 1, the control section 117 determines a solution for solving the paper mismatch of the slave tray, and guides the user to the determined solution. In the printing apparatus 1, the flow proceeds to step S88.

In step S88, the user performs an operation of giving an instruction for determining a solution to the printing apparatus 1 with reference to the guidance. As a result, in the printing apparatus 1, the control section 117 receives the instruction for solving the paper mismatch of the slave tray according to the determined solution, and solves the paper mismatch of the slave tray. The printing apparatus 1 finishes the process in the present flow.

In step S89, in the printing apparatus 1, the control section 117 determines a solution for solving the paper mismatch of the master tray, and guides the user to the determined solution. In the printing apparatus 1, the flow proceeds to step S90.

In step S90, the user performs an operation of giving an instruction for determining a solution to the printing apparatus 1 with reference to the guidance. Consequently, in the printing apparatus 1, the control section 117 receives the instruction for solving the paper mismatch of the master tray according to the determined solution, and solves the paper mismatch of the master tray. The printing apparatus 1 finishes the process in the present flow.

In step S91, in the printing apparatus 1, the control section 117 determines whether or not there is a paper mismatch in the slave tray.

In the printing apparatus 1, when the control section 117 determines that there is a paper mismatch in the slave tray as a result of the determination, the result is YES in step S91, and the flow proceeds to step S87.

On the other hand, in the printing apparatus 1, when the control section 117 determines that there is no paper mismatch in the slave tray as a result of the determination, the result is NO in step S91, and the process in the present flow is finished.

Here, as a specific example of the flow illustrated in FIG. 18, a case where a plurality of paper mismatches cannot be solved at the same time will be described.

In this example, the tray 51 is a slave tray and stores A6 plain paper.

In this example, the tray 52 is a master tray and stores A4 photo paper. It is assumed that A4 paper is frequently used in the master tray.

In the printing apparatus 1, it is assumed that the automatic setting of a tray to be used, the print setting of duplex, and the print setting of 4UP printing are selected as initial print settings.

In this case, in the printing apparatus 1, a prohibition relationship in which duplex printing cannot be performed on photo paper occurs with respect to the master tray, and a prohibition relationship in which 4UP printing cannot be performed on the A6 paper occurs with respect to the slave tray.

In steps S84 and S85, the printing apparatus 1 asks the user to perform one or both of changing the photo paper to the plain paper and changing duplex printing to simplex printing with respect to the master tray.

In steps S87 and S88, the printing apparatus 1 asks the user to perform one or both of changing the A6 paper to the A4 paper and changing 4UP printing to 1UP printing with respect to the slave tray.

In this example, the printing apparatus 1 performs the processes in steps S81 to S88.

Here, the print settings are finally changed such that the prohibition relationship is eliminated with respect to at least one of the master tray and the slave tray.

As another specific example of the flow illustrated in FIG. 18, a description will be made of a case where it is possible to solve a plurality of paper mismatches at the same time.

In this example, the tray 51 is a slave tray and stores A6 plain paper.

In this example, the tray 52 is a master tray and stores A5 plain paper. It is assumed that the A5 paper is frequently used in the master tray.

In the printing apparatus 1, it is assumed that the print setting of 4UP printing is selected as an initial print setting.

In this case, in the printing apparatus 1, a prohibition relationship in which 4UP printing cannot be performed on the A5 paper occurs with respect to the master tray, and a prohibition relationship in which 4UP printing cannot be performed on the A6 paper occurs with respect to the slave tray.

In steps S84 and S85, in the printing apparatus 1, one or both of changing the A5 paper to the A4 paper and changing 4UP printing to 1UP printing are performed with respect to the master tray.

For example, when at least 4UP printing is changed to 1UP printing, both the prohibition relationship regarding the master tray and the prohibition relationship regarding the slave tray are solved. Thus, when a guidance is performed such that the user is instructed to eliminate the paper mismatch of the master tray, the printing apparatus 1 performs the guidance such that changing the 4UP printing to the 1UP printing is prioritized to changing the A5 paper to the A4 paper. In this example, the printing apparatus 1 performs the processes in steps S81 to S86.

Here, the print settings are finally changed such that the prohibition relationship is eliminated with respect to both of the master tray and the slave tray.

Figure 19:
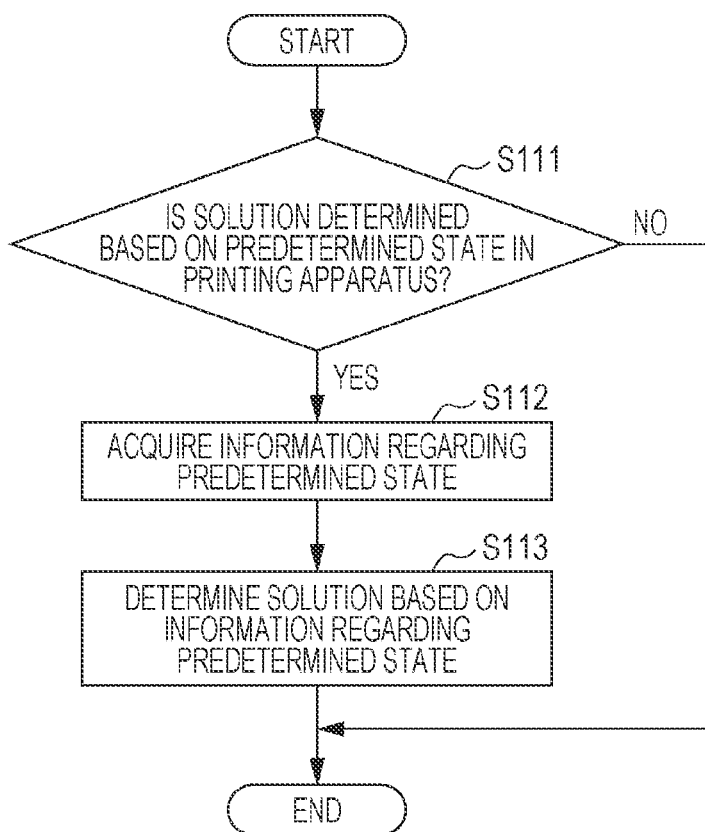
FIG. 19 is a diagram illustrating examples of process procedures performed in the printing apparatus according to the embodiment.

FIG. 19 is a diagram illustrating examples of process procedures performed in the printing apparatus 1 according to the embodiment.

Here, the flow illustrated in FIG. 19 may be inserted, for example, in the previous stage of step S1 in the flow illustrated in FIG. 14. In this case, the printing apparatus 1 proceeds to step S1 of the flow illustrated in FIG. 14 after the flow illustrated in FIG. 19 is finished.

For convenience of description, the process procedures in the present flow will be referred to as steps S111 to S114.

In step S111, in the printing apparatus 1, the control section 117 determines whether a solution is to be determined based on a predetermined state of the printing apparatus 1. Here, in this example, it is assumed that an error related to a prohibition relationship between print settings has occurred in the printing apparatus 1.

In the printing apparatus 1, when the control section 117 determines that a solution is to be determined based on the predetermined state of the printing apparatus 1 as a result of the determination, the result is YES in step S111, and the flow proceeds to step S112.

On the other hand, in the printing apparatus 1, when the control section 117 determines that a-solution is not to be determined based on the predetermined state of the printing apparatus 1 as a result of the determination, the result is NO in step S111, and, in the printing apparatus 1, the process in the present flow is finished.

In step S112, in the printing apparatus 1, the control section 117 acquires information regarding the predetermined state. In the printing apparatus 1, the flow proceeds to step S113.

In step S113, in the printing apparatus 1, the control section 117 determines a solution based on the acquired information regarding the predetermined state. The printing apparatus 1 finishes the process in the present flow.

Here, for example, the control section 117 may switch different solutions for each state according to the current predetermined state of the printing apparatus 1, and performs a process according to a switched solution to solve a prohibition relationship.

Figure 20:
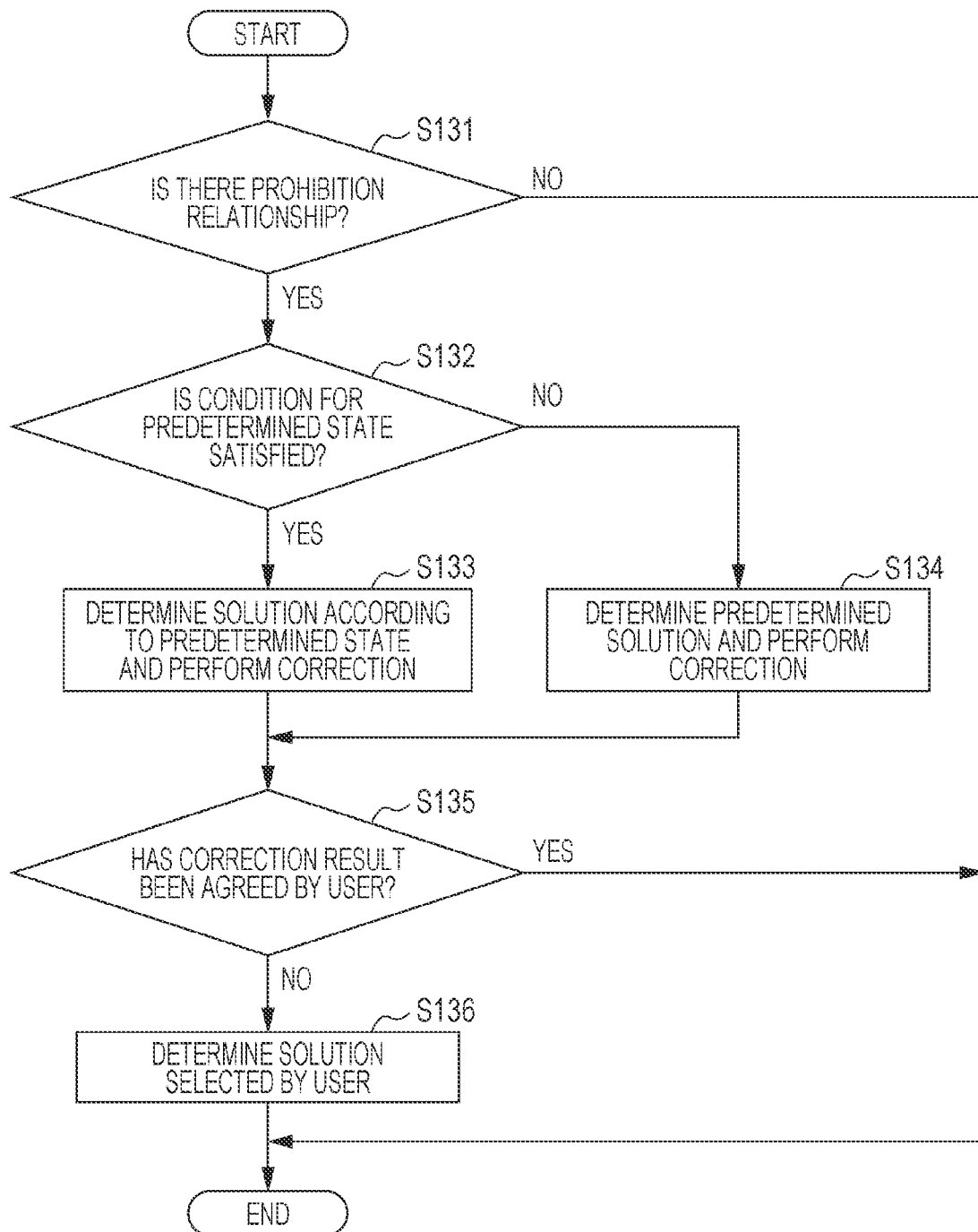
FIG. 20 is a diagram illustrating examples of process procedures performed in the printing apparatus according to the embodiment.

FIG. 20 is a diagram illustrating examples of process procedures performed in the printing apparatus 1 according to the embodiment.

Here, the flow illustrated in FIG. 20 may be used, for example, in the process in step S5 illustrated in FIG. 14.

For convenience of description, the process procedures in the present flow will be referred to as steps S131 to S136.

In step S131, in the printing apparatus 1, the control section 117 determines whether or not there is a prohibition relationship between the print settings.

In the printing apparatus 1, when the control section 117 determines that there is a prohibition relationship between the print settings as a result of the determination, the result is YES in step S131, and the flow proceeds to step S132.

On the other hand, in the printing apparatus 1, when the control section 117 determines that there is no prohibition relationship between the print settings as a result of the determination, the process in the present flow is finished.

In step S132, in the printing apparatus 1, the control section 117 determines whether or not a predetermined state condition for the printing apparatus 1 is satisfied.

In the printing apparatus 1, when the control section 117 determines that a predetermined state condition for the printing apparatus 1 is satisfied as a result of the determination, the result is YES in step S132, and the flow proceeds to step S133.

On the other hand, in the printing apparatus 1, when control section 117 determines that a predetermined state condition for the printing apparatus 1 is not satisfied as a result of the determination, the result is NO in step S132, and the flow proceeds to step S134.

In step S133, in the printing apparatus 1, the control section 117 determines a solution according to a predetermined state of the printing apparatus 1, and corrects a print setting by using the determined solution. In the printing apparatus 1, the flow proceeds to step S135.

In step S134, in the printing apparatus 1, the control section 117 determines a predetermined solution, and corrects a print setting by using the determined solution. In the printing apparatus 1, the flow proceeds to step S135.

Here, the predetermined solution is set in advance in, for example, the printing apparatus 1.

In step S135, in the printing apparatus 1, the control section 117 determines whether or not the correction result of the print setting has been agreed by the user. Here, the control section 117 displays, for example, the correction result of the print setting on the screen, and determines whether or not the correction result has been agreed by the user based on an operation performed by the user.

In the printing apparatus 1, when the control section 117 that the correction result of the print setting is agreed by the user as a result of the determination, the result is YES in step S135, and the process in the present flow is finished.

On the other hand, in the printing apparatus 1, when the control section 117 determines that the correction result of the print setting is not agreed by the user as a result of the determination, the result is NO in step S135, and the flow proceeds to step S136.

In step S136, in the printing apparatus 1, the control section 117 determines the solution selected by the user. The printing apparatus 1 finishes the process in the present flow.

Here, the control section 117 specifies the solution selected by the user, for example, based on an operation performed by the user.

Figure 21:
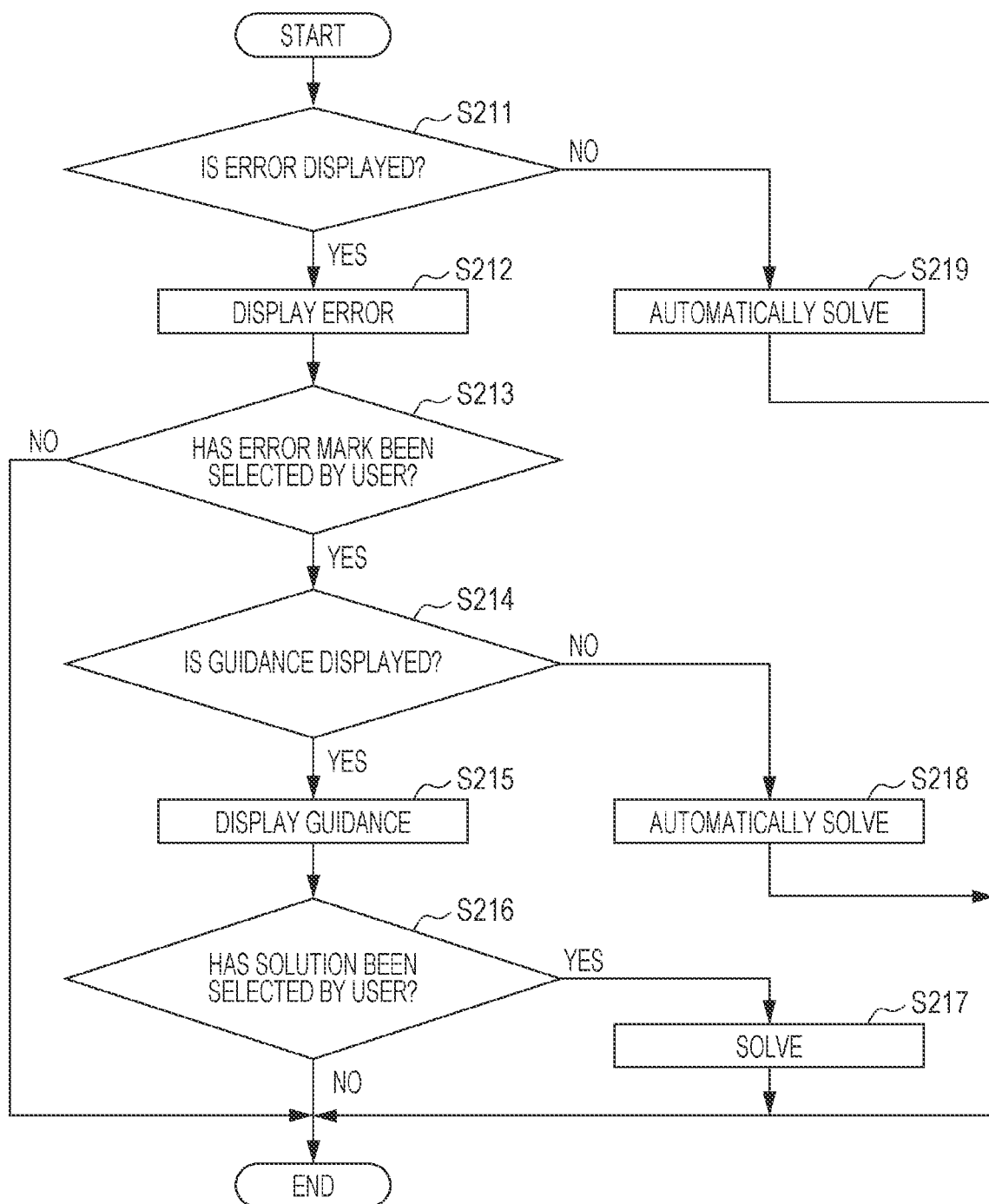
FIG. 21 is a diagram illustrating examples of process procedures performed in the printing apparatus according to the embodiment.

With reference to FIG. 21, as examples of processes performed in the printing apparatus 1 according to the embodiment, a description will be made of examples of a process of displaying an error regarding a prohibition relationship between the print settings, a process of determining a solution for solving the prohibition relationship between the print settings, and a process for solving the prohibition relationship between print settings according to the determined solution.

FIG. 21 is a diagram illustrating examples of process procedures performed in the printing apparatus 1 according to the embodiment.

Here, a flow illustrated in FIG. 21 may be used as a specific example of some of the processes in step S3, step S4, and step S5 illustrated in FIG. 14, for example.

For convenience of description, the process procedures in the present flow will be referred to as steps S211 to S219.

In step S211 of the printing apparatus 1, the control section 117 determines whether or not an error is to be displayed with respect to a prohibition relationship between the print settings.

In the printing apparatus 1, when the control section 117 determines that an error is to be displayed with respect to the prohibition relationship between the print settings as a result of the determination, the result is YES in step S211 and the flow proceeds to step S212.

On the other hand, in the printing apparatus 1, when the control section 117 determines that an error is not to be displayed with respect to the prohibition relationship between the print settings as a result of the determination, the result is NO in step S211, and the flow proceeds to step S219.

In step S212, in the printing apparatus 1, the control section 117 displays an error. In the printing apparatus 1, the flow proceeds to step S213.

In step S213, in the printing apparatus 1, the control section 117 determines whether or not an error mark has been selected by the user.

In the printing apparatus 1, when the control section 117 determines that an error mark has been selected by the user as a result of the determination, the result is YES in step S213, and the flow proceeds to step S214.

On the other hand, in the printing apparatus 1, when the control section 117 determines that an error mark has not been selected by the user as a result of the determination, the result is NO in step S213, and the process in the present flow is finished.

Here, as the error mark, for example, one or both of an individual error mark and a batch error mark may be used.

In step S214, in the printing apparatus 1, the control section 117 determines whether or not to a guidance is to be displayed by using a guidance message.

In the printing apparatus 1, when the control section 117 determines that a guidance is to be displayed by using the guidance message as a result of the determination, the result is YES in step S214, and the flow proceeds to step S215.

On the other hand, in the printing apparatus 1, when the control section 117 determines that a guidance is not to be displayed by using the guidance message as a result of the determination, the result is NO in step S214, and the flow proceeds to step S218.

In step S215, in the printing apparatus 1, the control section 117 displays the guidance by using the guidance message. In the printing apparatus 1, the flow proceeds to step S216.

In step S216, in the printing apparatus 1, the control section 117 determines whether or not a solution has been selected by the user.

In the printing apparatus 1, when the control section 117 determines that a solution has been selected by the user as a result of the determination, the result is YES in step S216, and the flow proceeds to step S217.

On the other hand, in the printing apparatus 1, when the control section 117 determines that a solution has not been selected by the user as a result of the determination, the result is NO in step S216, and the process in the present flow is finished.

In step S217, in the printing apparatus 1, the control section 117 solves the prohibition relationship according to the selected solution. The printing apparatus 1 finishes the process in the present flow.

In step S218, in the printing apparatus 1, the control section 117 automatically solves the prohibition relationship without providing a guidance. The printing apparatus 1 finishes the process in the present flow.

In step S219, in the printing apparatus 1, the control section 117 automatically solves the prohibition relationship without displaying an error. The printing apparatus 1 finishes the process in the present flow.

In the printing apparatus 1 according to the present embodiment, not only aspects of the above-described specific examples but also various other aspects may be performed.

Here, configuration examples of the printing apparatus 1 according to the present embodiment will be described.

As a configuration example, in the printing apparatus 1, the control section 117 performs, on the display section 112, individual error display indicating prohibition near display of print settings for n print settings having a prohibition relationship, n being one or more, and does not perform the individual error display near display of print settings for m print settings having the prohibition relationship, m being one or more. Here, for example, in the printing apparatus 1, a total of (n+m) prohibition relationships occur.

Therefore, in the printing apparatus 1, when a plurality of paper mismatches occur at the same time, it is possible to reduce a case where all of the plurality of paper mismatches cannot be solved without any user's trouble. As described above, in the printing apparatus 1, when a plurality of setting inconsistencies occur at the same time, it is possible to easily solve all of the setting inconsistencies.

That is, when a plurality of paper mismatches occur at the same time in the printing apparatus 1, in a case where the user is notified of all the paper mismatches at the same time, it may be difficult for the user to correctly understand the currently occurring paper mismatches, and thus there is a probability that inquiries from users will increase.

Therefore, in the present embodiment, when a plurality of paper mismatches occur at the same time in the printing apparatus 1, the user is notified of some of the paper mismatches, and thus it is facilitated that the user can correctly understand the currently occurring paper mismatches. As a result, in the printing apparatus 1, it is possible to facilitate the user to smoothly perform setting changes for solving the prohibition relationship regarding the print settings, and thus to improve usability.

For example, in the printing apparatus 1, when a plurality of prohibition relationships between different print settings occur among a large number of print settings, the user is notified of only one print setting through individual error display indicating the occurrence of the prohibition relationships.

For example, in the printing apparatus 1, when a plurality of prohibition relationships between different print settings occur among a large number of print settings, the user may be notified of the "paper setting" and one other print setting through individual error display indicating the occurrence of the prohibition relationships.

As a configuration example, in the printing apparatus 1, the control section 117 performs, on the display section 112, batch error display indicating prohibition at a position away from display of print settings for the print settings having m prohibition relationships.

Therefore, in the printing apparatus 1, when a plurality of paper mismatches occur at the same time, even in a case where individual error display is not performed for some of the paper mismatches, the user can be notified of the occurrence of some of the paper mismatches through batch error display.

As a configuration example, in the printing apparatus 1, the control section 117 displays screen display portions including display of a plurality of print settings on the display section 112 to be switchable by using tabs. In the printing apparatus 1, the control section 117 performs batch error display near the tab on the display section 112.

Therefore, in the printing apparatus 1, the batch error display can be performed at a position that is easily recognized by the user.

As a configuration example, in the printing apparatus 1, when there is a prohibition relationship between the print settings more than a first threshold value for print settings included in a first screen display portion currently being displayed on the display section 112, the control section 117 performs batch error display near a first tab of the first screen display portion.

In the printing apparatus 1, when there is the prohibition relationship between the print settings less than the first threshold value for the print settings included in the first screen display portion currently being displayed on the display section 112, the control section 117 does not perform batch error display near the first tab of the first screen display portion, and, when there is a prohibition relationship between print settings included in a second screen display portion currently not being displayed, the control section 117 performs the batch error display near a second tab of the second screen display portion regardless of the number of print settings having the prohibition relationship.

Here, the first threshold value may be, for example, 1 or 2 or greater.

In the printing apparatus 1, when there is a prohibition relationship between the same number of print settings as the first threshold value for the print settings included in the first screen display portion currently being displayed, the same process as in a case where there is a prohibition relationship between the print settings that are more than the first threshold value may be performed, or the same process as in a case where there is a prohibition relationship between the print settings that are less than the first threshold value may be performed.

Therefore, in the printing apparatus 1, when there are screen display portions corresponding to two or more tabs, the batch error display can be performed in an aspect that is easily recognized by the user.

As a configuration example, in the printing apparatus 1, the control section 117 performs, on the display section 112, individual error display near display of a print setting that enables a prohibition relationship to be solved by changing the minimum number of print settings, and does not perform the individual error display near display of a print setting that enables the prohibition relationship to be solved by changing a non-minimum number of print settings.

Here, the minimum number of changes of the print settings may be, for example, one or two or more.

As the print setting that enables a prohibition relationship to be solved by changing the minimum number of print settings, for example, the paper setting may be used, or another print setting may be used.

Therefore, in the printing apparatus 1, the user can solve the paper mismatch through the smallest number of operations.

As a configuration example, in the printing apparatus 1, the control section 117 sets print settings including the print setting A, the print setting B, and the print setting C based on an instruction received by the reception section 111, and controls printing according to the set print settings. In this case, in the printing apparatus 1, when the print setting A has a prohibition relationship with the print setting B, the control section 117 solves the prohibition relationship according to a solution in accordance with the print setting C.

Therefore, in the printing apparatus 1, when a plurality of paper mismatches occur at the same time, it is possible to solve all of the plurality of paper mismatches without any user's trouble. As described above, in the printing apparatus 1, when a plurality of setting inconsistencies occur at the same time, it is possible to easily solve all of the setting inconsistencies.

That is, in the printing apparatus 1, when the print setting A has a prohibition relationship with the print setting B, a solution is determined based on a prohibition relationship between at least one of the print setting A and the print setting B, and the print setting C, and thus it is possible to determine a solution that does not trouble the user. As a result, the printing apparatus 1 can facilitate setting changes for smoothly solving a prohibition relationship regarding print settings.

As a configuration example, in the printing apparatus 1, the print setting C is a print setting that is required to follow the user's operation on a mechanical mechanism other than the UI.

Therefore, in the printing apparatus 1, it is possible to solve all of a plurality of paper mismatches without any user's trouble based on the print setting C that is required to follow the user's operation on a mechanical mechanism other than the UI.

As another configuration example, in the printing apparatus 1, the print setting C is a print setting that is not required to follow the user's operation on the mechanical mechanism other than the UI.

Therefore, in the printing apparatus 1, it is possible to solve all of a plurality of paper mismatches without any user's trouble based on the print setting C that is not required to follow the user's operation on a mechanical mechanism other than the UI.

As a configuration example, in the printing apparatus 1, when the print setting A has a prohibition relationship with the print setting B, and the print setting A has no prohibition relationship with the print setting C, the control section 117 eliminates the prohibition relationship by changing the print setting B.

in the printing apparatus 1, when the print setting A has a prohibition relationship with both the print setting B and the print setting C, the control section 117 eliminates the prohibition relationship by changing the print setting A.

Therefore, in the printing apparatus 1, when the print setting A has a prohibition relationship with the print setting B, a solution is determined based on the prohibition relationship between the print setting A and the print setting C, and thus it is possible to solve all of a plurality of paper mismatches without any user's trouble.

As a configuration example, in the printing apparatus 1, in a case where the print setting A has a prohibition relationship with the print setting B, and does not fall into the prohibition relationship with the print setting C even when the print setting B is changed, the control section 117 eliminates the prohibition relationship by changing the print setting B.

In the printing apparatus 1, in a case where the print setting A has a prohibition relationship with the print setting B, and falls into the prohibition relationship with the print setting C when the print setting B is changed, the control section 117 eliminates the prohibition relationship by changing the print setting A.

Therefore, in the printing apparatus 1, in a case where the print setting A has a prohibition relationship with the print setting B, it is possible to solve all of a plurality of paper mismatches without any user's trouble based on whether or not the print setting A falls into the prohibition relationship with the print setting C when the print setting B is changed.

As a configuration example, in the printing apparatus 1, when the print setting A has a prohibition relationship with the print setting B, the control section 117 performs individual error display indicating prohibition near display of one of the print setting A and the print setting B according to the print setting C, and does not perform the individual error display near display of the other.

Therefore, in the printing apparatus 1, when the print setting A has a prohibition relationship with the print setting B, the individual error display is performed for only one of the print setting A and the print setting B based on the print setting C, and thus it is possible to facilitate the user to determine a solution without any user's trouble.

As a configuration example, in the printing apparatus 1, the control section 117 solves a prohibition relationship by changing a print setting according to the user's instruction.

Therefore, the printing apparatus 1 may change a print setting according to the user's instruction, and thus it is possible to solve the prohibition relationship.

As a configuration example, in the printing apparatus 1, there are a first prohibition solution for solving a prohibition relationship by changing p print settings, p being one or more, and a second prohibition solution for solving the prohibition relationship by changing q print settings, q being more than p, the control section 117 solves the prohibition relationship according to the first prohibition solution. That is, the control section 117 selects and uses a solution with less changes of print settings in order to solve the prohibition relationship.

Therefore, in the printing apparatus 1, it is possible to solve all of a plurality of paper mismatches without any user's trouble. Preferably, in the printing apparatus 1, the user can solve the paper mismatch through the smallest number of operations.

As a configuration example, in the printing apparatus 1, the control section 117 solves a prohibition relationship between the print settings by using different solutions depending on a state of the printing apparatus 1. Here, as the state of the printing apparatus 1, for example, a combination of two or more different states may be used.

Therefore, in the printing apparatus 1, when a plurality of paper mismatches occur at the same time, it is possible to solve all of the plurality of paper mismatches without any user's trouble. As described above, in the printing apparatus 1, when a plurality of setting inconsistencies occur at the same time, it is possible to easily solve all of the setting inconsistencies.

That is, when a plurality of paper mismatches occur at the same time in the printing apparatus 1, it is possible to determine a solution according to the state of the printing apparatus 1. As a result, the printing apparatus 1 can facilitate setting changes for smoothly solving a prohibition relationship regarding print settings.

For example, in the printing apparatus 1, in a case where a state of an amount of paper stored in the tray used for paper feeding is used, when an amount of the paper is large, a priority of allocating a plurality of original documents to one sheet of paper may be set to be low, and, on the contrary, when an amount of the paper is small, a priority of allocating a plurality of original documents to one sheet of paper may be set to be high. As described above, in the printing apparatus 1, it is possible to determine a solution based on a priority according to the current predetermined state.

As the state of the printing apparatus 1, for example, states other than setting states in a plurality of predetermined modes that are switchable in the printing apparatus 1 may be used. The predetermined plurality of modes may be, for example, a professional mode for users who are accustomed to operation and a beginner mode for beginners.

However, as the state of the printing apparatus 1, setting states in a predetermined plurality of modes that are switchable in the printing apparatus 1 may be used, and, for example, combinations of the setting states in the predetermined plurality of modes and other states may be used.

As a configuration example, in the printing apparatus 1, the control section 117 switches one of the following first to fifth solving processes to another solving process depending on a state of the printing apparatus 1.

The first solving process is a process of a solution for canceling a previous instruction that is prohibited from being combined with an instruction received later, and is a process of a so-called after-win solution.

The second solving process is a process of a solution for not receiving a future instruction that is prohibited from being combined with an instruction received earlier, and is a process of a so-called first-win solution.

The third solving process is a process of a solution for canceling an instruction when the instruction that is prohibited from being combine with a received instruction and has a low priority has already been received, and prohibiting an instruction that is prohibited from being combined with the instruction after the received instruction and has a low priority from being received, and is a process of a solution based on a defined priority.

The fourth solving process is a process of a solution for presenting a plurality of candidates for a combination of instructions for releasing a combination of prohibited instructions and allowing a user to select a candidate, and is a process of a solution based on the user determination.

The fifth solving process is a process of a solution for displaying print settings having a prohibition relationship in an identifiable manner, and for example, the user's instruction may be received thereafter.

Therefore, in the printing apparatus 1, when a plurality of paper mismatches occur at the same time, a plurality of solving processes are switched to a suitable solving process according to a state of the printing apparatus 1, and thus it is possible to solve all of the plurality of paper mismatches without any user's trouble.

As a configuration example, in the printing apparatus 1, the control section 117 uses a state related to at least one of ink and a printing medium used by the printing apparatus 1 as the state of the printing apparatus 1.

Therefore, in the printing apparatus 1, when a plurality of paper mismatches occur at the same time, it is possible to solve all of the plurality of paper mismatches without any user's trouble according to at least one of the state related to ink and the state related to the printing medium.

As a configuration example, in the printing apparatus 1, the control section 117 uses a state related to a residual quantity of the battery of the printing apparatus 1 as the state of the printing apparatus 1.

Therefore, in the printing apparatus 1, when a plurality of paper mismatches occur at the same time, it is possible to solve all of the plurality of paper mismatches without any user's trouble according to the state related to the residual quantity of the battery.

As a configuration example, in the printing apparatus 1, the control section 117 uses a state related to the number of times of the same instruction being repeated with respect to the user's instruction as the state of the printing apparatus 1.

Therefore, in the printing apparatus 1, when a plurality of paper mismatches occur at the same time, it is possible to solve all of the plurality of paper mismatches in accordance with the user's intention according to the state related to the number of times of the same instruction being repeated by the user.

As a configuration example, in the printing apparatus 1, the control section 117 uses a state related to contract conditions regarding the use of the printing apparatus 1 as the state of the printing apparatus 1.

Therefore, in the printing apparatus 1, when a plurality of paper mismatches occur at the same time, it is possible to solve all of the plurality of paper mismatches without any user's trouble according to the state related to the contract conditions regarding the use of the printing apparatus 1.

As a configuration example, in the printing apparatus 1, the control section 117 uses a state of a mechanical switching mechanism that is included in the printing apparatus 1 and cannot automatically perform switching as the state of the printing apparatus 1.

Therefore, in the printing apparatus 1, when a plurality of paper mismatches occur at the same time, it is possible to solve all of the plurality of paper mismatches without any user's trouble according to the state of the mechanical switching mechanism that cannot automatically perform switching.

A modification example of the present embodiment will be described.

A printing system 901 according to a modification example of the embodiment will be described with reference to FIG. 22.

In the example illustrated in FIG. 2, the configuration example in which the control section 117 of the printing apparatus 1 performs various types of control has been described, but, as a modification example of the embodiment, a case where a printing apparatus and a control apparatus are configured as separate apparatuses will be described.

Figure 22:
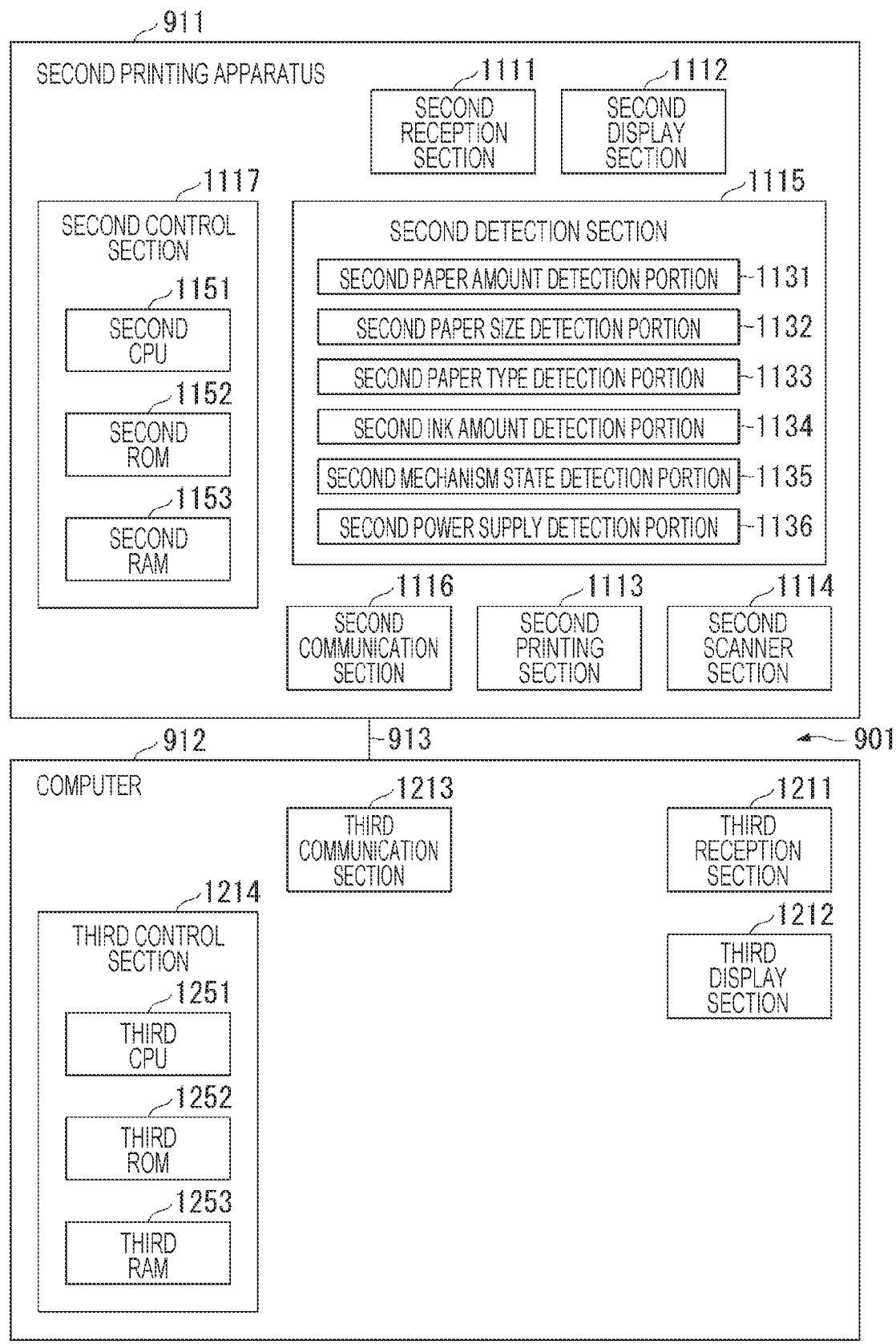
FIG. 22 is a diagram illustrating a schematic configuration of a printing system according to a modification example of the embodiment.

FIG. 22 is a diagram illustrating a schematic configuration of a printing system 901 according to the modification example of the embodiment.

The printing system 901 includes a second printing apparatus 911, a computer 912 as an example of a control apparatus, and a line 913.

The second printing apparatus 911 and the computer 912 are communicatively coupled to each other via the line 913.

Here, the line 913 may be, for example, a wired line or a wireless line.

The second printing apparatus 911 includes a second reception section 1111, a second display section 1112, a second printing section 1113, a second scanner section 1114, a second detection section 1115, a second communication section 1116, and a second control section 1117.

The second detection section 1115 includes a second paper amount detection portion 1131, a second paper size detection portion 1132, a second paper type detection portion 1133, a second ink amount detection portion 1134, a second mechanism state detection portion 1135, and a second power supply detection portion 1136.

The second control section 1117 includes a second CPU 1151, a second ROM 1152, and a second RAM 1153.

The computer 912 includes a third reception section 1211, a third display section 1212, a third communication section 1213, and a third control section 1214.

The third control section 1214 includes a third CPU 1251, a third ROM 1252, and a third RAM 1253.

Here, in the printing system 901, the computer 912 controls the second printing apparatus 911 to perform an operation similar to the operation performed in the printing apparatus 1 illustrated in FIG. 1, for example.

That is, in the printing system 901, the computer 912 and the second printing apparatus 911 cooperate with each other to perform various operations.

Functional blocks of the computer 912 will be described.

The third reception section 1211 has an operation portion operated by a user, and receives details of an operation performed on the operation portion by the user. The third reception section 1211 may be, for example, a keyboard, a mouse, or the like.

The third display section 1212 has a screen, and displays various information on the screen.

The third communication section 1213 communicates with an external apparatus.

The communication may be, for example, wired communication or wireless communication.

In the example illustrated in FIG. 22, the third communication section 1213 communicates with the second printing apparatus 911.

The third communication section 1213 may be referred to as a communication circuit, a communication port, a communication interface, or the like.

The third control section 1214 performs various types of control.

The third ROM 1252 and the third RAM 1253 store various information. The information may also include, for example, a program and parameters used by the program.

The third ROM 1252 and the third RAM 1253 may be freely used.

The third CPU 1251 performs various types of control by executing the program by using a storage region of the third RAM 1253.

In the example illustrated in FIG. 22, the third control section 1214 communicates with the second printing apparatus 911 to perform communication of various information with the second printing apparatus 911, and thus performs various types of control on the second printing apparatus 911.

Functional blocks of the second printing apparatus 911 will be described.

The functional blocks of the second printing apparatus 911 are the same as the functional blocks of the printing apparatus 1 illustrated in FIG. 1 except that the second printing apparatus 911 is controlled by the computer 912.

In the example illustrated in FIG. 22, the second communication section 1116 communicates with the computer 912.

In the example illustrated in FIG. 22, the second control section 1117 communicates with the computer 912 to perform communication of various information with the computer 912, and is thus controlled by the computer 912 to perform various types of control.

A program according to the present embodiment will be described.

As a configuration example, there is provided a program that receives user's instructions for a plurality of setting items and causes a computer to execute control of a control target, the program causing the computer to realize a reception function of receiving the user's instructions, a control function of setting the setting items based on the instructions received by the reception function and controlling the control target according to the set setting items, and a display function of performing individual error display near display of the setting items for n setting items having a prohibition relationship, n being one or more, and not performing the individual error display near display of the setting items for m setting items having the prohibition relationship, m being one or more.

As a further configuration example, various aspects described in the present embodiment may be used.

As a configuration example, there is provided a program that receives user's instructions for a plurality of setting items and causes a computer to execute control of a control target, the program causing the computer to realize a reception function of receiving the user's instructions, a control function of setting the setting items including a setting item A, a setting item B, and a setting item C based on the user's instructions received by the reception function and controlling the control target according to the set setting items, and a solving function of solving a prohibition relationship according to a solution in accordance with the setting item C when the setting item A and the setting item B have the prohibition relationship.

As a further configuration example, various aspects described in the present embodiment may be used.

As a configuration example, there is provided a program that receives user's instructions for a plurality of setting items and causes a computer to execute control of a control target, the program causing the computer to realize a reception function of receiving the user's instructions, a control function of setting the setting items based on the instructions received by the reception function and controlling the control target according to the set setting items, and a solving function of solving a prohibition relationship between the setting items according to different solutions depending on a state of an apparatus having the control target.

As a further configuration example, various aspects described in the present embodiment may be used.

Here, in the present embodiment, in each of the programs described above, the control target is, for example, the printing process or mechanism in the printing apparatus 1 according to the present embodiment, or the printing process or mechanism in the second printing apparatus 911 according to the modification example. In the present embodiment, in the program, the setting items are setting items related to printing.

in the present embodiment, each of the programs described above may be used as, for example, a firmware program in the printing apparatus 1 according to the present embodiment, a firmware program in the second printing apparatus 911 according to the modification example, a program related to a UI such as a control panel provided in the printing apparatus 1 according to the present embodiment, a program related to a UI such as a control panel provided in the second printing apparatus 911 according to the modification example, or an application program in the computer 912 that controls the second printing apparatus 911 according to the modification example. The application program in the computer 912 may be, for example, a driver program for controlling the second printing apparatus 911 according to the modification example, or may be installed in the computer 912.

As another configuration example, the control target may be a control target related to an apparatus such as a scanner other than the printing apparatus, and the setting items may be any setting items in the apparatus such as the scanner. The apparatus or the program may be, for example, configured to be housed in one casing, or may be configured to be realized through cooperation of functional portions housed in two or three or more casings.

A program for realizing the function of any constituent portion of any apparatus such as the printing apparatus 1, the second printing apparatus 911, or the computer 912 described above may be recorded on a computer-readable recording medium, and the program loaded to the computer system and executed. The "computer system" mentioned here includes an operating system or hardware such as peripheral devices. The "computer-readable recording medium" refers to, for example, a portable medium such as a flexible disk, a magnetooptical disc, a ROM, or a compact disc (CD)-ROM, or a storage device such as a hard disk built into a computer system. The "computer-readable recording medium" includes a medium that stores the program for a predetermined time, such as a volatile memory inside the computer system serving as a server or a client when the program is transmitted via a network such as the Internet or a communication line such as a telephone line. The volatile memory may be, for example, a RAM. The recording medium may be, for example, a non-transitory recording medium.

The program may be transmitted from a computer system that stores the program in a storage device or the like to another computer system via a transmission medium or a transmission wave in the transmission medium. Here, the "transmission medium" for transmitting the program refers to a medium having a function of transmitting information, such as a network such as the Internet or a communication line such as a telephone line.

The program may be a program for realizing some of the functions described above. The program may be a so-called difference file which can realize the above-mentioned function in combination with a program already recorded in the computer system. The difference file may be called a difference program.

The functions of any constituent portions of any apparatus such as the printing apparatus 1, the second printing apparatus 911, or the computer 912 described above may be realized by a processor. For example, each process in the embodiment may be realized by a processor that operates based on information such as a program and a computer-readable recording medium that stores information such as the program. Here, in the processor, for example, the functions of each portion may be realized by individual hardware, or the functions of each part may be realized by integrated hardware. For example, the processor includes hardware, which may include at least one of a circuit that processes a digital signal and a circuit that processes an analog signal. For example, the processor may be configured by using either or both of one or more circuit devices mounted on a circuit board and one or more circuit elements. An integrated circuit (IC) or the like may be used as the circuit device, and a resistor or a capacitor may be used as the circuit element.

Here, the processor may be, for example, a CPU. However, the processor is not limited to the CPU, and various processors such as a graphics processing unit (GPU) or a digital signal processor (DSP) may be used. The processor may be, for example, a hardware circuit using an ASIC. The processor may be configured with, for example, a plurality of CPUs, or may be configured with a hardware circuit using a plurality of ASICs. The processor may be configured with, for example, a combination of a plurality of CPUs and a hardware circuit using a plurality of ASICs. The processor may include, for example, one or more amplifier circuits or filter circuits for processing an analog signal.

Although the embodiments of the present disclosure have been described in detail with reference to the drawings, a specific configuration is not limited to the present embodiment, and includes the design and the like within the scope without departing from the spirit of the present disclosure.

What is claimed is:

1. A printing apparatus that receives user's instructions for a plurality of print settings and controls printing, the printing apparatus comprising:
   a reception section that receives the user's instructions; and
   a control section that sets the print settings based on the instructions received by the reception section and controls the printing according to the set print settings; and
   a display section that performs display, wherein
   the control section performs, on the display section, individual error display indicating prohibition near display of the print settings for n print settings having a prohibition relationship, n being one or more, and does not perform the individual error display near display of the print settings for m print settings having the prohibition relationship, m being one or more, wherein
   the control section performs, on the display section, batch error display indicating the prohibition at a position away from the display of the print settings for the m print settings having the prohibition relationship,
   when there is the prohibition relationship between the print settings more than a first threshold value for the print settings included in a first screen display portion currently being displayed, the control section performs, on the display section, the batch error display near a first tab of the first screen display portion,
   when there is the prohibition relationship between the print settings less than the first threshold value for the print settings included in the first screen display portion currently being displayed, the control section does not perform, on the display section, the batch error display near the first tab of the first screen display portion, and
   when there is the prohibition relationship between the print settings included in a second screen display portion currently not being displayed, the control section performs, on the display section, the batch error display near a second tab of the second screen display portion regardless of the number of print settings having the prohibition relationship.

2. The printing apparatus according to claim 1, wherein the control section displays, on the display section, a screen display portion including display of the plurality of print settings in a switchable manner by using a tab, and performs the batch error display near the tab.

3. A printing apparatus that receives user's instructions for a plurality of print settings and controls printing, the printing apparatus comprising:
   a reception section that receives the user's instructions; and
   a control section that sets the print settings based on the instructions received by the reception section and controls the printing according to the set print settings; and
   a display section that performs display, wherein
   the control section performs, on the display section, individual error display indicating prohibition near display of the print settings for n print settings having a prohibition relationship, n being one or more, and does not perform the individual error display near display of the print settings for m print settings having the prohibition relationship, m being one or more, wherein
   the control section, on the display section, performs the individual error display near display of a print setting that enables the prohibition relationship to be solved by changing a minimum number of print settings, and does not perform the individual error display near display of a print setting that enables the prohibition relationship to be solved by changing a non-minimum number of print settings.

4. The printing apparatus according to claim 3, wherein the control section performs, on the display section, batch error display indicating the prohibition at a position away from the display of the print settings for the m print settings having the prohibition relationship.

5. A non-transitory computer-readable storage medium storing a program that receives user's instructions for a plurality of setting items and causes a computer to execute control of a control target, the program causing the computer to realize:

a reception function of receiving the user's instructions;

a control function of setting the setting items based on the instructions received by the reception function and controlling the control target according to the set setting items; and a display function of performing individual error display near display of the setting items for n setting items having a prohibition relationship, n being one or more, and not performing the individual error display near display of the setting items for m setting items having the prohibition relationship, m being one or more, wherein the program causes the computer to realize the control function of, on a display section, performing the individual error display near display of a print setting that enables the prohibition relationship to be solved by changing a minimum number of print settings, and not performing the individual error display near display of a print setting that enables the prohibition relationship to be solved by changing a non-minimum number of print settings.

* * * * *